US 11,359,598 B2

(12) United States Patent
Echenique Subiabre

(10) Patent No.: US 11,359,598 B2
(45) Date of Patent: Jun. 14, 2022

(54) SYSTEM AND METHOD FOR DETERMINING A TARGET POWER AND/OR TARGET TORQUE OF AN ENERGY CONVERSION DEVICE

(71) Applicant: POWER ENABLE SOLUTIONS LIMITED, Edinburgh (GB)

(72) Inventor: Estanislao Juan Pablo Echenique Subiabre, Edinburgh (GB)

(73) Assignee: POWER ENABLE SOLUTIONS LIMITED, Edinburgh (GB)

( * ) Notice: Subject to any disclaimer, the term of this patent is extended or adjusted under 35 U.S.C. 154(b) by 280 days.

(21) Appl. No.: 16/311,857

(22) PCT Filed: Jun. 20, 2017

(86) PCT No.: PCT/GB2017/051800
§ 371 (c)(1),
(2) Date: Dec. 20, 2018

(87) PCT Pub. No.: WO2017/220994
PCT Pub. Date: Dec. 28, 2017

(65) Prior Publication Data
US 2019/0195189 A1    Jun. 27, 2019

(30) Foreign Application Priority Data
Jun. 21, 2016   (GB) .................................. 1610798

(51) Int. Cl.
G05B 13/02      (2006.01)
F03B 15/00      (2006.01)
F03D 7/00       (2006.01)

(52) U.S. Cl.
CPC .............. F03B 15/00 (2013.01); F03D 7/00 (2013.01); G05B 13/024 (2013.01);
(Continued)

(58) Field of Classification Search
CPC ....... G05B 13/024; Y02E 10/20; Y02E 10/72; Y02E 10/76; F03B 15/00; F03D 7/00; F05B 2270/00
See application file for complete search history.

(56) References Cited

U.S. PATENT DOCUMENTS 7,990,743 B2 * 8/2011 Walling .................... H02J 3/50
                                                    363/71
7,994,658 B2   8/2011 Cardinal et al.
(Continued)

FOREIGN PATENT DOCUMENTS

CN         1559097 A      12/2004
CN       103306896 A       9/2013
(Continued)

OTHER PUBLICATIONS

K. Tan, T. T. Yao and S. Islam, "Effect of loss modeling on optimum operation of wind turbine energy conversion systems," 2005 International Power Engineering Conference, 2005, pp. 1-92, doi: 10.1109/IPEC.2005.206885. (Year: 2005).*

(Continued)

Primary Examiner — M. N. Von Buhr
(74) Attorney, Agent, or Firm — Nixon & Vanderhye P.C.

(57) ABSTRACT

A method and associated apparatus for determining at least one parameter of an energy conversion device, the method comprising determining one or more losses associated with the energy conversion device; determining at least one parameter of the energy conversion device by improving, varying, optimising or maximising at least one operational variable and/or output of the energy conversion device (such as a power output of the energy conversion device) by reducing, minimising or optimising the one or more losses or a function thereof; and determining a value, range or function of at least one parameter of the energy conversion device (such as a power or torque curve) associated with, or (Continued)

that results in, the improvement, variation, optimisation or maximisation of the at least one operational variable (e.g. power output) and/or output of the energy conversion device and/or that results in the reduction, minimisation or optimisation of the one or more losses.

12 Claims, 15 Drawing Sheets

(52) U.S. Cl.
CPC .......... *F05B 2270/00* (2013.01); *Y02E 10/20* (2013.01); *Y02E 10/72* (2013.01); *Y02E 10/76* (2013.01)

(56) References Cited

U.S. PATENT DOCUMENTS

| | | | |
|---|---|---|---|
| 8,076,789 B2 | 12/2011 | Miller | |
| 8,178,986 B2 | 5/2012 | Vyas et al. | |
| 8,290,634 B2* | 10/2012 | Larsen | F03D 9/257 700/287 |
| 9,494,624 B2* | 11/2016 | Prats Mustarós | G01R 19/2513 |
| 2004/0022081 A1* | 2/2004 | Erickson | H02M 5/297 363/159 |
| 2005/0042098 A1 | 2/2005 | Wobben | |
| 2009/0218817 A1* | 9/2009 | Cardinal | F03D 7/028 290/44 |
| 2010/0150718 A1* | 6/2010 | Freda | F03D 1/02 416/120 |
| 2010/0274401 A1 | 10/2010 | Kjaer et al. | |
| 2011/0215577 A1* | 9/2011 | Martin Da Silva | F03D 7/043 290/44 |
| 2011/0241630 A1* | 10/2011 | Ritchey | H02P 9/02 322/23 |
| 2013/0241209 A1 | 9/2013 | Andersen et al. | |
| 2013/0334824 A1* | 12/2013 | Freda | F03D 9/25 290/55 |
| 2014/0248123 A1 | 9/2014 | Turner et al. | |
| 2014/0327243 A1 | 11/2014 | Demtröder | |
| 2015/0260159 A1* | 9/2015 | Jimenez Buendia | F03D 7/0284 290/44 |
| 2015/0369214 A1 | 12/2015 | Herbsleb et al. | |
| 2016/0108890 A1* | 4/2016 | Garcia | F03D 9/257 700/287 |
| 2017/0234299 A1* | 8/2017 | Kjaer | F03D 9/257 290/44 |

FOREIGN PATENT DOCUMENTS

| | | |
|---|---|---|
| EP | 2 336 558 | 6/2011 |
| EP | 2 736 164 | 5/2014 |
| EP | 2 918 824 | 9/2015 |
| JP | 6-117353 | 4/1994 |
| WO | 2014/194914 | 12/2014 |
| WO | 2015/189032 | 12/2015 |

OTHER PUBLICATIONS

A. Mesemanolis, C. Mademlis and I. Kioskeridis, "Optimal Efficiency Control Strategy in Wind Energy Conversion System With Induction Generator," in IEEE Journal of Emerging and Selected Topics in Power Electronics, vol. 1, No. 4, pp. 238-246, Dec. 2013, doi: 10.1109/JESTPE.2013.2284562. (Year: 2013).*

M. C. Di Piazza and M. Pucci, "Efficiency analysis in induction motor drives with discontinuous PWM and electrical loss minimization," 2014 International Conference on Electrical Machines (ICEM), 2014, pp. 736-743, doi: 10.1109/ICELMACH.2014. 6960263. (Year: 2014).*

M. C. Di Piazza and M. Pucci, "Efficiency issues in induction motor drives: Modelling and losses minimization techniques," 2015 IEEE Workshop on Electrical Machines Design, Control and Diagnosis (WEMDCD), 2015, pp. 171-177, doi: 10.1109/WEMDCD.2015. 7194526. (Year: 2015).*

Chen J, Chen J and Gong C, "On Optimizing the Transient Load of Variable-Speed Wind Energy Conversion System During the MPP Tracking Process", IEEE Transactions on Industrial Electronics, vol. 61, No. 9, Sep. 2014, (9 pages).

Echenique Subiare EJP, Mueller M.A., Bertényi T. and Young T., "Realistic Loss Modelling and Minimisation in an Air-Cored Permanent Magnet Generator for Wind Energy Applications", 6th IET International Conference on Power Electronics, Machines and Drives (PEMD 2012), Jul. 19, 2012, DOI: 10.1049/ (8 pages).

Estanislao J.P. Echenique; Ozan Keysan; Markus A. Mueller, "Rotor Loss Prediction in Air-Cored Permanent Magnet Machines", 2013 International Electric Machines & Drives Conference, Jul. 15, 2013, DOI: 10.1109/IEMDC.2013.6556268 (8 pages).

Fingersh, L.J., Johnson, K.E., "Baseline Results and Future Plans for the NREL Controls Advanced Research Turbine", Collection of ASME Wind Energy Symposium Technical Papers AIAA Aerospace Sciences Meeting and Exhibition, PY—Jan. 5, 2004, DOI: 10.2514/6.2004-347 (10 pages).

Mesemanolis A., Mademlis C. and Kioskeridis I., "Maximum Efficiency of a Wind Energy Conversion System with a PM Synchronous Generator", 7th Mediterranean Conference and Exhibition on Power Generation, Transmission, Distribution and Energy Conversion Nov. 7-10, 2010, Agia Napa, Cyprus (Paper No. MED10/128) (9 pages).

Ahmed, G., Abo-Khalil, Hyeong-Gyun Kim, Dong-Choon Lee, and Jul-Ki Seok, "Maximum Output Power Control of Wind Generation System Considering Loss Minimization of Machines", The 30th Annual Conference of the IEEE Industrial Electronics Society, Nov. 2-6, 2004, Busan, Korea, (6 pages).

Tan, K., Yao, T.T., Islam S., "Effect of Loss Modeling on Optimum Operation of Wind Turbine Energy Conversion Systems", 2005 International Power Engineering Conference, May 8, 2006, DOI: 0.1109/IPEC.2005.206885 (6 pages).

International Search Report for PCT/GB2017/051800, dated Sep. 27, 2017, 4 pages.

Written Opinion of the ISA for PCT/GB2017/051800, dated Sep. 27, 2017, 6 pages.

* cited by examiner

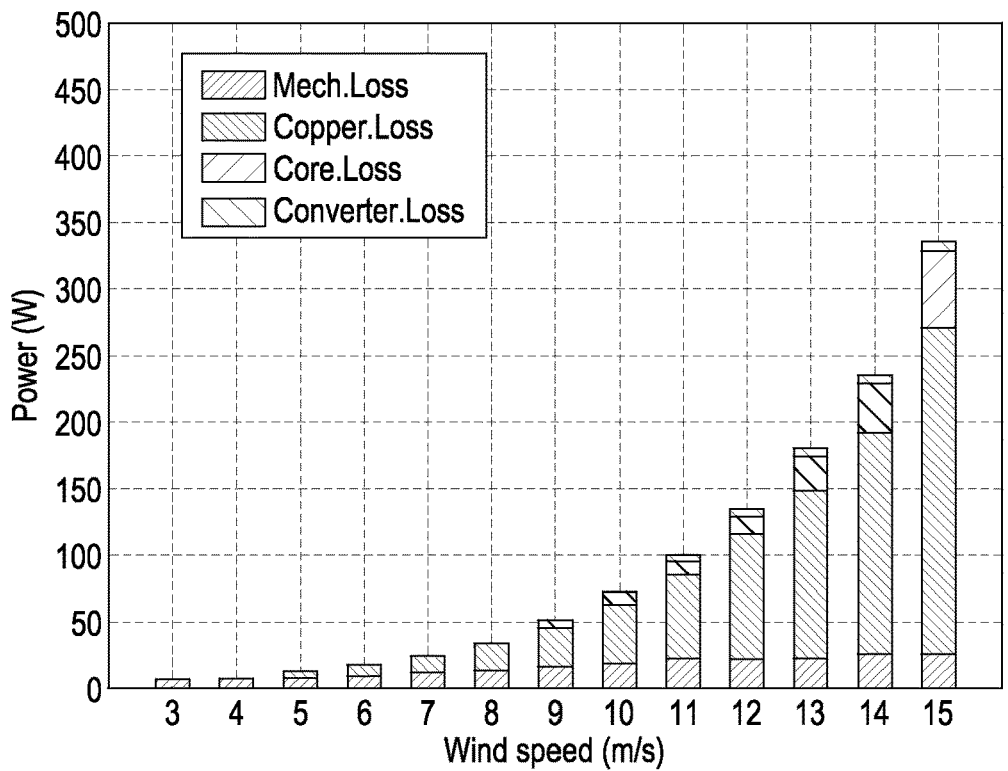
Figure 21 (diode rectifier)
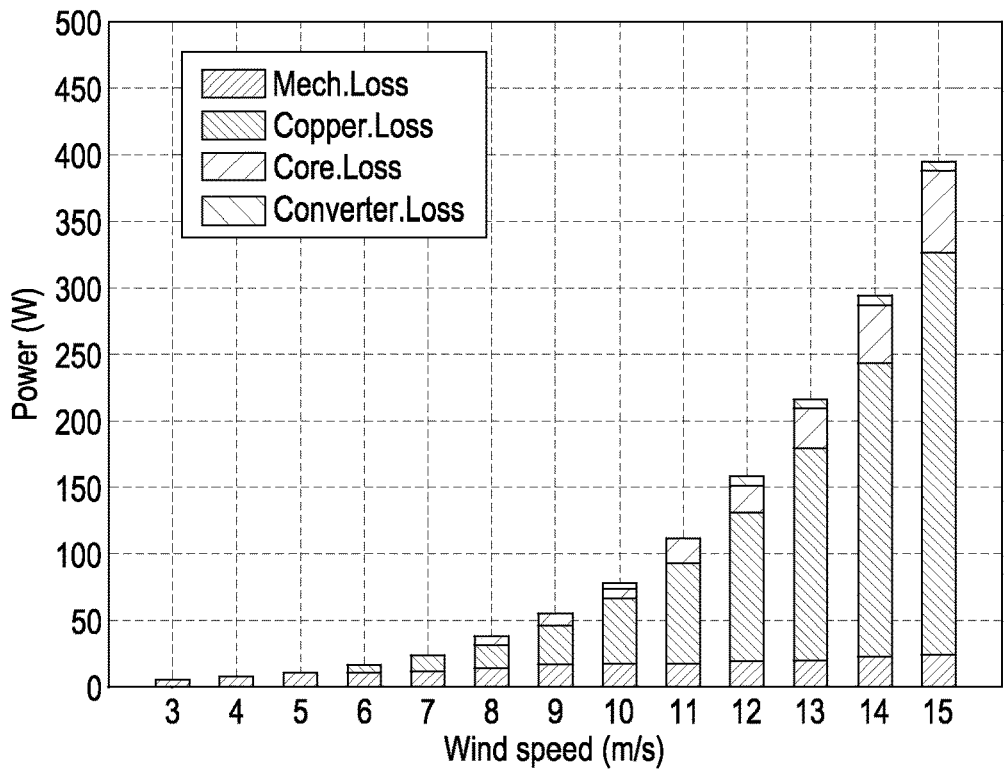
Figure 22

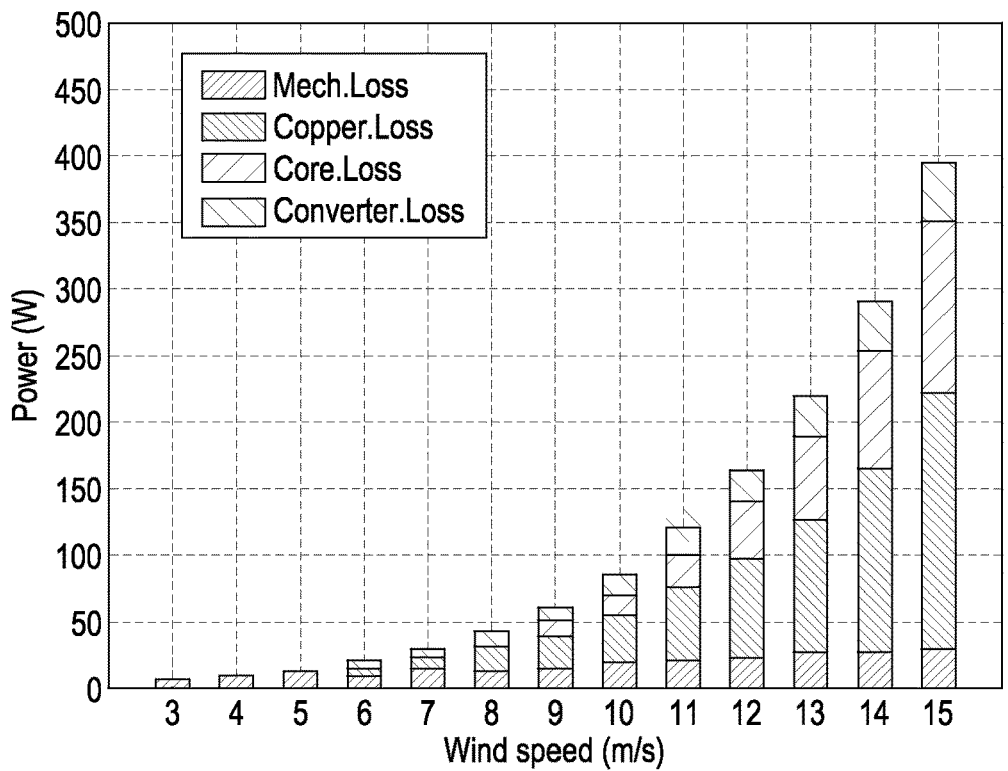
Figure 23 (active rectifier)
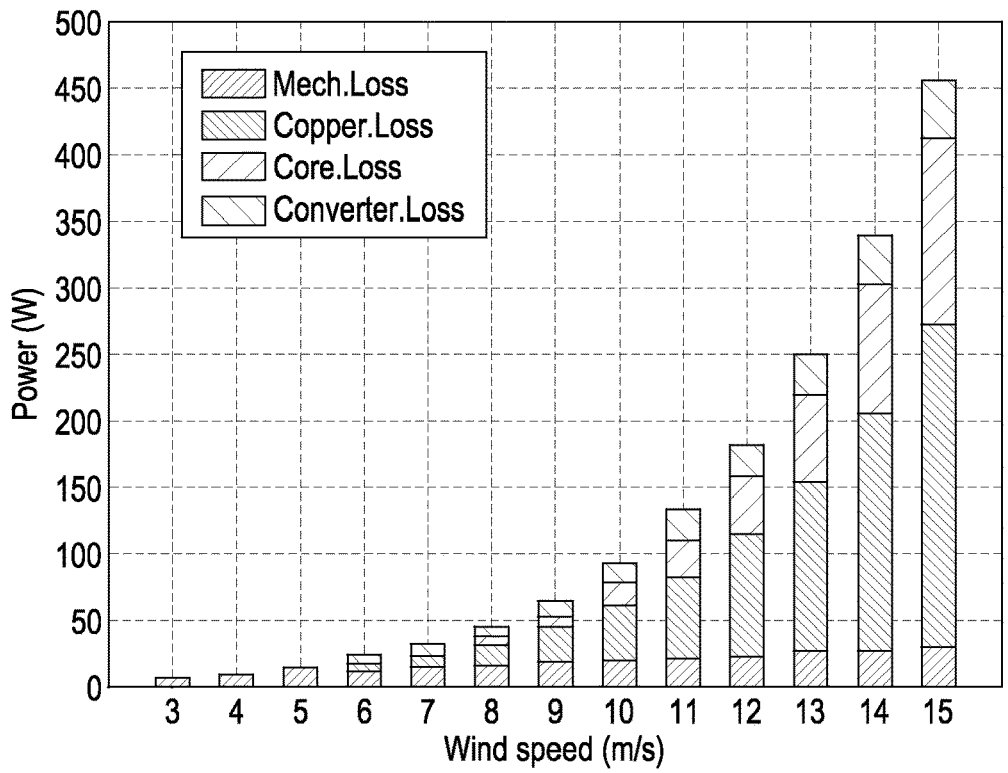
Figure 24

SYSTEM AND METHOD FOR DETERMINING A TARGET POWER AND/OR TARGET TORQUE OF AN ENERGY CONVERSION DEVICE

This application is the U.S. national phase of International Application No. PCT/GB2017/051800 filed 20 Jun. 2017, which designated the U.S. and claims priority to GB Patent Application No. 1610798.9 filed 21 Jun. 2016, the entire contents of each of which are hereby incorporated by reference.

FIELD

The present invention relates to a control and processing system and method for determining parameters, particularly operating parameters, of an energy conversion device, such as a wind or tidal turbine, the control and processing system and method preferably but not essentially being for controlling operation of the energy conversion device according to the determined parameters.

BACKGROUND

Improving the efficiency of energy conversion devices, particularly renewable or green energy conversion devices, such as wind or tidal/water turbines has been a big challenge. Traditionally, in turbine systems such as wind or tidal/water turbines, operation of the turbine has been based on optimising aerodynamic or hydrodynamic efficiency, as appropriate.

Typically, a control unit of the turbine is provided with a power or torque vs rotor or wind or water speed control curve that has been calculated with the goal of maximising theoretical aerodynamic or hydrodynamic efficiency. Then, during use, the rotational speed of an electrical generator or drive shaft or other drive coupling of the turbine is adjusted to achieve a target power output or torque associated with a measured current rotor or wind or water speed, as indicated by the power or torque vs rotor or wind or water speed control curve.

The speed of the generator is controlled by adjusting the resistant torque which is opposed to the rotational movement of the turbine. Ultimately, the resistant torque can be controlled by a variable load, with the task performed by the power electronic devices connected in between the generator and the grid. The wind unsteadiness forces the system to continuously adjust the harnessed power using a feed-back controller, so the rotor can adjust its speed accordingly.

The problem solved by at least one embodiment of at least one aspect of the present invention may be to improve the efficiency of energy conversion devices, such as turbines, particularly wind or tidal/water turbines. At least one embodiment of at least one aspect of the present invention seeks to overcome or mitigate at least one problem in the prior art.

EP2736164 describes a method for efficiency optimization of a wind generator by specifically controlling a squirrel cage induction generator. This method keeps the aerodynamic power coefficient at a maximum at all times.

EP2954202 attempted to predict the dynamic behaviour of the turbine in a defined horizon of time in order to minimise pitch activity and/or electrical torque variations. The method does not take into account the efficiency of the generator and/or power converter in the optimisation objective.

SUMMARY

According to a first aspect of the present invention, there is provided a method for determining at least one parameter of an energy conversion device, the method comprising:
  determining one or more losses associated with the energy conversion device;
  determining at least one parameter of the energy conversion device by improving, varying, optimising or maximising at least one operational variable and/or output of the energy conversion device by reducing, minimising or optimising the one or more losses or a function thereof.

Conventionally, in the art, it is believed that the optimum operating conditions of an energy conversion device is achieved by maximising the aerodynamic or hydrodynamic efficiency. However, contrary to the conventional understanding in the art, the present inventors have surprisingly found that, particularly but not exclusively in small systems, losses can have a higher weight in the overall efficiency of the system. Thus, at least one embodiment of the present invention advantageously employs a global optimisation approach that, whilst taking into account aerodynamic or hydrodynamic power conversion efficiency, minimises or optimises mechanical and/or electrical losses in order to determine the at least one parameter (e.g. an operating and/or design parameter) of the energy conversion device.

The method may comprise determining a value, range or function of at least one parameter of the energy conversion device associated with, or that results in, the improvement, variation, optimisation or maximisation of the at least one operational variable and/or output of the energy conversion device and/or that results in the reduction, minimisation or optimisation of the one or more losses. The at least one parameter of the energy conversion device may be a control, set point and/or operating parameter of the energy conversion device. The at least one parameter of the energy conversion device may comprise or be comprised in power or target or set-point power (e.g. a power, output power and/or electrical or mechanical power curve), or torque or target or set-point torque (e.g. a torque, output torque and/or a drive shaft torque curve). The power or torque curve may be a curve of power or torque respectively against wind speed (e.g. nacelle or freestream wind speed) or rotor or drive shaft rotation speed.

The method may comprise controlling operation of the energy conversion device according to the at least one parameter of the energy conversion device. The method may comprise controlling the at least one operational variable and/or output of the energy conversion device and/or one or more other variable, e.g. the power (e.g. output power and/or electrical power) and/or torque (e.g. drive shaft torque), of the energy conversion device, according to the at least one parameter (e.g. according to the power or torque curve). The method may comprise controlling the at least one operational variable or output or other variable of the energy conversion device (e.g. power and/or torque of the energy conversion device) according to the at least one parameter (e.g. the power or torque curve) and at least one measured or determined parameter, such as wind speed (e.g. nacelle or freestream wind speed) or rotor or drive shaft rotation speed.

The method may comprise controlling the at least one operational variable or output or other variable of the energy conversion device by controlling or adjusting operation of at least one component of the energy conversion device, such as a generator. Controlling the at least one operational value or output or other variable of the energy conversion device may comprise adjusting a resistant torque that is opposed to the rotational movement of the turbine. Controlling the at least one operational value or output or other variable of the energy conversion device may comprise controlling a variable load, which may be performed by power electronic devices connected in between the generator and the grid.

The method may further comprise determining an aerodynamic or hydrodynamic efficiency of the energy conversion device. The aerodynamic or hydrodynamic efficiency of the energy conversion device may comprise an aerodynamic or hydrodynamic power or torque efficiency of the energy conversion device. The at least one parameter of the energy conversion device may be determined using the aerodynamic or hydrodynamic efficiency of the energy conversion device. The improvement, variation, optimisation or maximisation of the at least one operational variable and/or output of the energy conversion device may comprise varying, optimising or maximising a function of the aerodynamic or hydrodynamic efficiency of the energy conversion device and the one or more losses associated with the energy conversion device. The function to be varied, optimised or maximised may be a function of the aerodynamic or hydrodynamic efficiency (or a function thereof) less the one or more losses (or a function thereof).

The improvement, variation, optimisation or maximisation of the at least one operating variable and/or output of the energy conversion device may be or comprise a global optimisation or maximisation. The improvement, variation, optimisation or maximisation of the at least one operating variable and/or output of the energy conversion device may be or comprise may comprise performing a global optimisation of a function that comprises at least the one or more losses and may comprise or consider the aerodynamic or hydrodynamic power efficiency of the energy conversion device and may comprise the reduction, minimisation or optimisation of the one or more losses (or the function thereof), and determining the at least one parameter of the energy conversion device associated with the reduced, minimised or optimised losses (or the function thereof).

The losses may comprise mechanical and/or electrical losses, e.g. the mechanical and/or electrical losses associated with at least one, preferably a plurality of or each component or active member of the energy conversion device. The at least one parameter may be or comprise an operating and/or design parameter of the energy conversion device.

For example, since at least one operating variable or output, e.g. power or torque output, may be optimised by performing a combined/integrated optimisation on a function that comprises or represents the mechanical and/or electrical losses, such as losses due to at least one or more of the generator, the power convertor, the inverter and/or the filter, and preferably also the aerodynamic and/or hydrodynamic efficiency, in the same optimization step/function, then the optimization may include aerodynamic or hydrodynamic, electrical and mechanical considerations, e.g. considerations of the effects on the rotor, the generator and the power converter, in a single combined, integrated optimization. In the method described herein, the aerodynamic or hydrodynamic efficiency may vary from, e.g. be less than, the optimal value for aerodynamic efficiency that would be determined from optimizing aerodynamic efficiency alone, for example, if a corresponding increase in electrical and/or mechanical efficiencies result in an increased overall or global efficiency. In this way, the optimization may be improved over the cases where optimization of aerodynamic considerations alone or separate optimizations for aerodynamic efficiencies and losses take place, e.g. in different functions or optimizations.

The reduction, minimisation or optimisation of the losses and/or the improvement, variation, optimisation or maximisation of the at least one output of the energy conversion device (e.g. power and/or torque) may comprise applying a least squares, newton/secant method, monte-carlo, genetic algorithm, simulated annealing and/or any other suitable optimisation or maximum or minimum finding technique known in the art to the function of the one or more losses of the energy conversion device and, optionally, the aerodynamic or hydrodynamic power efficiency of the energy conversion device. The losses associated with the energy conversion device may be or comprise losses of the energy conversion device and/or losses associated with operation of the energy conversion device. The losses may be or comprise overall losses associated with operation of the energy conversion device.

The energy conversion device may be or comprise or be comprised in a wind energy converter, such as a wind turbine. The energy conversion device may be or comprise or be comprised in a tidal energy converter, such as a tidal or water turbine. The energy conversion device may be or comprise or be comprised in devices of any power rating, such as devices having a power rating in the order of kW or MW, but is advantageously applicable to a small scale energy conversion device, e.g. having a rated maximum output of 500 kW or less, such as 200 kW or less, which may be 50 kW or less.

The energy conversion device may comprise a rotor. The energy conversion device (e.g. the rotor) may comprise one or more drive surfaces, which may be provided on a movable or rotatable arrangement. The one or more drive surfaces may be, comprise or be comprised in turbine blades, which may be mounted on, integral with or otherwise coupled to a drive shaft or other drive coupling (such as a chain, belt, prop shaft, and/or the like). Although the energy conversion device is preferably a direct drive device, alternatively, the one or more drive surfaces may be coupled to the drive shaft (and/or the generator) via a gearbox. The one or more drive surfaces may be configured such that, in use, flow (such as wind or water or other flow) may be incident on the one or more drive surfaces in order to operate the energy conversion device, e.g. by turning the turbine blades. The rotor may comprise the one or more drive surfaces, the turbine blades, and/or the drive shaft or other drive coupling.

The energy conversion device may comprise at least one generator, which may be coupled to, and/or operable by, the drive shaft or other drive coupling. The at least one generator may be configured to convert mechanical energy, e.g. provided to the generator by or via the drive shaft or other drive coupling, to electrical energy. The energy conversion device may comprise a power convertor, which may comprise at least one rectifier and/or at least one inverter, such as at least one passive or active rectifier and/or at least one active inverter. The energy conversion device may comprise an electrical filter. The power convertor, rectifier, inverter and/or electrical filter may be configured to at least partially or wholly convert the electrical output of the at least one generator into the output (e.g. electrical output) provided by the energy conversion device, e.g. by one or more of: converting from dc to ac, providing a specified or required voltage and/or current or voltage range and/or current range, and/or the like.

The energy conversion device may be or comprise or be comprised in a permanent magnet machine. The energy conversion device may not be or not comprise or not be comprised in a squirrel cage induction generator (SCIG). The energy conversion device may be or comprise or be comprised in a double-fed induction machine. The energy conversion device may be or comprise a variable speed energy conversion device. The energy conversion device is preferably but not essentially a direct drive energy conversion device, e.g. the generator is directly driven by the turbine blades via the drive shaft or drive coupling rather than via a gearbox. This arrangement may achieve high efficiency, and may provide a reasonable sized generator.

The at least one operating parameter may comprise at least one operating parameter used to control the energy conversion device, e.g. as a set, target, control, operating or reference point, range or curve. The at least one operating parameter may comprise one or more of a torque curve, such as an optimal torque curve, a power curve, such as an optimal power curve, and/or a speed curve, such as an optimal speed curve. The method may comprise updating or replacing one or more or each of the values of the at least one operating parameter (e.g. the power or torque curves) stored on or accessible from data storage with the one or more or each value of the at least one operating parameter (e.g. the power or torque curve) determined in use or inline. This may be carried out without removing the existing control system used by the manufacturer of the wind turbine.

The global optimisation may comprise maximising output power. The global optimisation may comprise estimating the maximum system efficiency operating point conditions, e.g. given as a torque vs rotor speed or power vs rotor speed relationship applied on the drive shaft or other drive coupling, and the DC-link voltage between rectification stage (AC to DC) and inversion stage (DC to AC) of the power converter, in such a way that the total losses of the system (e.g. aerodynamic or hydrodynamic, mechanical, and electrical) are reduced. The method may optimize or maximise the output power (e.g. electrical power) injected into the grid or power delivered before reaching the electrical transformer.

The losses may comprise losses associated with individual components of the energy conversion device, e.g. a function, sum or combination of component losses. The losses may comprise losses from one or more or each of the components of the energy conversion device that are involved in, e.g. directly involved in, energy conversion. The components of the system may comprise or consist of one or more or each of: the generator, the drive surfaces and/or blades, the drive shaft or other drive coupling, the power converter, the rectifier, the inverter, and/or the electrical filter.

The mechanical losses may comprise mechanical losses resulting from or associated with one or more or each of: operation of the turbine blades and/or operation of the drive shaft or other drive coupling and/or operation of the generator.

The mechanical losses in the drive shaft or drive coupling (e.g. the connection between the generator and the rotor blade(s)) may be obtained from a direct measurement procedure (e.g. by using a torque transducer), or estimated from online operation.

The electrical losses may comprise one or more or each of: generator losses, convertor losses, filter losses and/or inverter losses.

The generator losses may comprise one or more of: copper and/or resistance losses, core losses and/or eddy current losses. The generator losses may comprise a thermal variation factor or function, which may account for variations due to changes in temperature of the generator.

The converter losses may comprise conduction losses and/or switching losses. The converter losses may comprise one or more of: conduction losses in one or more power switches of the energy conversion device, conduction losses in one or more diodes such as anti-parallel diodes of the energy conversion device; and/or switching losses. The electrical losses, particularly the converter losses, may be derived numerically or analytically, for example, by taking as inputs the manufacturing parameters of the semiconductors used in the power converter, and/or the like. The losses in the power converter may be modelled assuming steady-state conditions, e.g. because their time constants may be many times lower than the mechanical constants of wind or water speed fluctuations and mechanical speed variations. One or more or each of the losses may be measured, derived from manufacturer's data sheets, derived from experimental or test rig data, derived using modelling, e.g. finite elements analysis, and/or the like. The efficiency curve of the converter may be obtained from a look-up table or may be modelled using a fitted function, e.g. that takes the x-axis as load ($P_{out}/P_{rated}$) and y-axis as efficiency ($P_{out}/P_{in}$) for different voltages.

The present inventors have realised that each stage in the energy conversion, such as the turbine blades, drive shaft or coupling, generator, convertor, filter and/or inverter, may be associated with its own efficiency. As such, the global optimum of the at least one operating parameter may be better determined by including the losses associated with at least one, preferably a plurality of, and most preferably each, stage of the energy conversion. It will be appreciated that, depending on the energy conversion device and/or its intended operating environment, that losses associated with certain of the components may be more or less significant that losses associated with other components.

The electrical losses, e.g. electrical losses in the generator, may be derived from parameters of one or more equivalent electric circuits. The electrical losses may be estimated using measurements of one or more of: voltage, phase currents and/or rotor speed. The electrical losses may be derived using a system identification approach, which may estimate the parameters of an equivalent electric circuit. The parameters of the equivalent electric circuit may comprise an EMF no-load voltage of the circuit, which may be calculated, for example, based on manufacturing data, or obtained in a no-load test, or from readings with an initial condition estimated from Finite Element Modelling or any suitable analytical derivation, and/or the like.

The method may comprise deriving an equivalent thermal resistance from windings of the generator to ambient, which may be derived, for example, experimentally and/or by measurement using sensors or other suitable measurement apparatus, or from any other suitable modelling technique, using a test apparatus or prototype, manufacturer's data sheets, and/or the like.

The method may comprise using the derived equivalent ambient thermal resistance in the determination of electrical losses. This may account for any variation in electrical losses (e.g. copper, core, etc.) and ambient temperature.

The improvement, variation, optimisation or maximisation of the at least one operating variable and/or output of the energy conversion device (e.g. the global optimisation) may comprise determining a maximum value of the at least one operating variable or output, e.g. power or torque output, for example by performing an optimisation on a function of the mechanical and/or electrical losses, such as losses due to at least one or more of the generator, the power convertor, the inverter and/or the filter, and preferably also the aerodynamic and/or hydrodynamic efficiency. The improvement, variation, optimisation or maximisation of the at least one operating variable and/or output of the energy conversion device (e.g. the global optimisation) may comprise minimising the overall losses, which may comprise minimising the mechanical and/or electrical losses or a function thereof, e.g. one or more or each of the losses due to the generator, the power convertor, the inverter and/or the filter.

The aerodynamic or hydrodynamic efficiency may be a function of an aerodynamic or hydrodynamic power coefficient ($C_p(\lambda)$) which may be a function of the tip speed ratio ($\lambda$) of the energy conversion device and/or the rotor's blade pitch angle. The tip speed ratio ($\lambda$) may be a function of the angular frequency of the rotor speed of the energy conversion device, the blade swept area of the energy conversion device, and/or the wind or water speed. The aerodynamic or hydrodynamic efficiency may be a function of available power of the wind or water flow, which may be a function of the density of the air or water, the blade swept area perpendicular to the air-flow or water-flow crossing the blades of the turbine and the wind or water speed. The available power of the wind or water flow may be proportional to the cube of the wind or water speed.

The improvement, variation, optimisation or maximisation of the at least one operating variable and/or output of the energy conversion device (e.g. the global optimisation) may be subject to one or more assumptions, limits or boundary conditions. The one or more assumptions, limits or boundary conditions may comprise, restrict, specify or limit one or more or each of: a maximum rotational speed of the rotor, turbine blades, drive shaft or other drive coupling and/or the one or more generators, a maximum DC current generated, a maximum phase current generated, and/or a maximum DC voltage generated.

The one or more assumptions, limits or boundary conditions may comprise one or more or each of:
- the determined output power or torque of the energy conversion device being less than or equal to the rated power or torque for the energy conversion device or a function thereof;
- the angular frequency or rotor speed being less than or equal to a maximum limit, which may be or comprise a value at which a brake is applied, e.g. automatically applied;
- noise emitted by the energy conversion device being less than a predetermined threshold, which may be less than 45 dB.
- the voltage, e.g. d.c. voltage, which may be output from the generator rectifier, being less than or equal to a voltage limit, e.g. a voltage limit allowed by, or a maximum rated voltage of, the inverter, or a function thereof;
- the output current being less than a current limit or maximum current, such as a preset or predetermined current limit or maximum current;
- the power generated by the rotor or turbine blades being equal to an active power supplied to the generator plus mechanical losses;
- the active power supplied to the generator less the electrical losses being equal to the sum of the dc voltage and dc current generated by the generator; and/or
- the output power being equal to the output rotor power minus electrical losses and/or mechanical losses.

Optionally, an estimated output power or operating set point may be used, which may, for example, be or be derived from the aerodynamic efficiency ($C_p$-$\lambda$) and the generator losses.

The method may comprise varying, maximising or optimizing the output power injected into the grid or power delivered before reaching the electrical transformer, and may simultaneously satisfy the operational limits established by the manufacturer, or the operational limits that maximise the lifetime of the energy conversion device.

The improvement, variation, optimisation or maximisation of the at least one operating variable and/or output of the energy conversion device (e.g. the global optimisation) may start with an initial estimate of the at least one parameter, e.g. the output power or output torque. The initial estimate may comprise an initial estimate derived by optimising the aerodynamic or hydrodynamic efficiency, e.g. without considering the electrical and/or mechanical losses.

The at least one parameter of the energy conversion device may be determined using an iterative, feedback or goal seek process. The global optimisation may comprise applying an interior point algorithm, e.g. to maximise the at least one operating parameter, e.g. output power and/or torque. The improvement, variation, optimisation or maximisation of the at least one operating variable and/or output of the energy conversion device (e.g. the global optimisation) may comprise least squares, newton/secant method, monte-carlo, genetic algorithm, simulated annealing and/or any other suitable optimisation or maximum or minimum finding or numerical solution technique known in the art.

The improvement, variation, optimisation or maximisation of the at least one operating variable and/or output of the energy conversion device (e.g. the global optimisation) may comprise determining the at least one parameter of the energy conversion device associated with the reduced, minimised or optimised losses, or function thereof, that maximises or optimizes the system efficiency and/or reliability or power or torque output by the energy conversion device and/or power injected into the grid, e.g. in a region below a maximum rotational speed of the turbine/turbine blades, e.g. by performing the improvement, variation, optimisation or maximisation of the at least one operating variable and/or output of the energy conversion device (e.g. the global optimisation) using the aerodynamic and/or hydrodynamic efficiency and the losses associated with one or more of the components of the energy conversion device and subject to at least one or more or each of the assumptions, limits or boundary conditions.

The method may comprise establishing a mathematical model of the aerodynamic or hydrodynamic efficiency of the rotor blades, e.g. based on field measurements, during normal turbine operation.

The method may comprise determining a function that represents the aerodynamic/hydrodynamic efficiency of the rotor blades, such as a $C_p$-Tip Speed Ratio (TSR) curve that describes the aerodynamic or hydrodynamic efficiency of the rotor blades. The function, e.g. the $C_p$-Tip Speed Ratio (TSR) curve, may be derived from one or more of: a wind tunnel test performed on the turbine blades; a software modelling package, e.g. using Computational Fluid Dynamics (CFD); any other suitable computational and/or modelling technique known in the art; and/or estimated based on in-field measurements. The function, e.g. the Cp-TSR curve, may be in the form of a look-up table, or a function such as a fitting polynomial expression, or an exponential function or the like.

The method may comprise estimating numerical coefficients or parameters of the function that represents the aerodynamic/hydrodynamic efficiency of the rotor blades (e.g. the $C_p$-Tip Speed Ratio (Cp-TSR) curve).

The method may comprise estimating the mechanical losses, which may be represented as a torque parameter or mathematical function.

The method may comprise measuring or estimating operational data, which may comprise one or more or each of: a generator speed (e.g. at the drive shaft, rotor shaft and/or other drive coupling), a nacelle wind speed, the freestream wind speed, and/or phase currents and/or voltages of the generator.

The operational data may comprise the parameters of the equivalent electric circuit, e.g. one or more or each of the measurements of voltage, the phase currents, the rotor speed and/or the EMF no-load voltage of the equivalent electric circuit.

The method may comprise performing an optimisation, e.g. numerical optimisation, that finds coefficients that fit, e.g. best fit, the operational data. The optimisation may minimise an error between the predicted and measured rotor speed and/or minimise an error between predicted and measured generator output power, or dc power, or output power.

The method may comprise using the operational data in the determination of the losses and/or the hydrodynamic or aerodynamic efficiency.

The method may comprise controlling or selecting an operating, control or set-point relationship between speed and one or more property such as power and/or torque of the energy conversion device, e.g. of the turbine/turbine blades or rotor or drive shaft or other drive coupling, based on the one or more parameters, which may comprise accelerating or decelerating the turbine/turbine blades or rotor or drive shaft or other drive coupling. In this way, the speed of the turbine, turbine blades and/or rotor or drive shaft may be indirectly controlled rather than being directly controlled.

The operational data may be or comprise data collected over a variable or predetermined period. The operational data may be collected at sampling periods in the order of seconds or less, for example, less than 20 seconds, e.g. 1 second or less such as 0.5 seconds or less. The operational data may be averaged, e.g. in periods in the order of minutes, such as 1, 10 or 20 minutes or more. A sampling rate of the operational data may be selected or determined, e.g. so as to cover dynamics characteristics of the wind speed and rotor speed fluctuations.

The method may be performed inline, in use and/or in real time. The method may be performed recursively, e.g. while new data is obtained from the wind/tidal turbine. The method may comprise recalculating or redetermining the at least one parameter of the energy conversion device, e.g. in an iterative or feedback process or loop, which may be carried out in real time, inline or in use or offline.

In particular the method, and/or recalculation of aerodynamic efficiency may be performed on a regular or periodic basis, such as on a daily or weekly basis. The optimum recalculation timescales may vary depending on the use, the particular device, the location of the device amongst other factors. However, it will be appreciated that the system may keep learning from new datasets acquired on a regular basis.

The method may be performed by a processing or control system.

According to a second aspect of the present invention, there is provided a processing or control system for an energy conversion device, the processing or control system being configured to determine at least one parameter of the energy conversion device by:

determining one or more losses associated with the energy conversion device;

determining at least one parameter of the energy conversion device by varying, increasing, optimising or maximising at least one operational variable or output of the energy conversion device by reducing, minimising or optimising the one or more losses or a function thereof.

Determining the at least one parameter of the energy conversion device may comprise determining a value, range or function of at least one or more or each of the at least one parameters of the energy conversion device that reduces, minimises or optimises the one or more losses or a function thereof.

The processing or control system may be configured to acquire or determine an aerodynamic or hydrodynamic efficiency of the energy conversion device. The processing or control system may be configured to determine the at least one parameter of the energy conversion device using the aerodynamic or hydrodynamic efficiency of the energy conversion device. The processing or control system may be configured to determine, optimise or maximise the at least one output of the energy conversion device by determining, optimising or maximising a function of the aerodynamic or hydrodynamic efficiency of the energy conversion device and the one or more losses associated with the energy conversion device. The function to be determined, optimised or maximised may be a function of the aerodynamic or hydrodynamic efficiency or a function thereof less the one or more losses or a function thereof.

The determination, optimisation or maximisation of the at least one output of the energy conversion device may be a global determination, optimisation or maximisation.

The losses may comprise mechanical and/or electrical losses. The at least one parameter may be or comprise an operating or design parameter of the energy conversion device.

The processing or control system may be configured to calculate, optimise or maximise the at least one output of the energy conversion device by performing a global optimisation of a function that comprises at least the one or more losses and considers the aerodynamic or hydrodynamic power efficiency of the energy conversion device. The processing or control system may be configured to calculate, optimise or maximise the at least one output of the energy conversion device by reducing, minimising or optimising the losses or a function thereof, and may be configured to determine the at least one parameter of the energy conversion device associated with the reduced, minimised or optimised losses or the function thereof.

The energy conversion device may be or comprise or be comprised in a wind energy converter, such as a wind turbine. The energy conversion device may be or comprise or be comprised in a tidal energy converter, such as a tidal or water turbine. The energy conversion device may be or comprise or be comprised in a small scale energy conversion device, e.g. having a rated maximum output of 500 kW or less, such as 200 kW or less, which may be 50 kW or less.

The processing or control system may be configured to reduce, minimise or optimise the losses by maximising an output of the energy conversion device, e.g. a power output, determined using a function of the aerodynamic or hydrodynamic power efficiency of the energy conversion device and the determined one or more losses associated with the energy conversion device by varying trial values for the at least one parameter of the energy conversion device. The reduction, minimisation or optimisation may comprise reducing, minimising or optimising a function of at least the aerodynamic or hydrodynamic power efficiency of the energy conversion device and one or more or each of the losses associated with the energy conversion device. The losses associated with the energy conversion device may be or comprise losses of the energy conversion device and/or losses associated with operation of the energy conversion device. The losses may be or comprise overall losses associated with operation of the energy conversion device.

The processing or control system may be configured to perform the method of the first aspect.

The processing or control system may comprise at least one or more processors. The processing or control system may comprise and/or be configured to access data storage, which may comprise memory, such as RAM and/or ROM, solid state storage or memory such as flash memory or other similar storage, a hard drive, an optical drive, magnetic storage, and/or the like. The data storage may be configured to store one or more computer program products configured such that, when run by the at least one processor, cause the processor to implement the method. The data storage may comprise, store or be configured to store the at least one parameter of the energy conversion device (e.g. the at least one target, set point or operating parameter, such as the power or torque curve). The processing or control system may be a main processing or control system of the energy conversion device. The processing or control system may be an ancillary or additional processing or control system, e.g. that may be retro-fitted or retro-fittable, and configured to communicate with a main control system of the energy conversion device, e.g. via a communications system.

The communications system may be or comprise a wireless and/or wired communications system. The communication system may comprise one or more analog and/or digital communications ports for receiving data from one or more sensors and/or for sending the at least one operating parameter to a main control device of the energy conversion device. The communications system may be configured to receive data from one or more sensors or other measurement instruments of the energy conversion device, which may be configured to collect the operational data, e.g. a generator speed and/or drive shaft rotation speed sensor, a nacelle wind speed sensor, a freestream wind speed sensor (such as a LIDAR wind speed measurement device), and/or a sensor for measuring phase currents and/or voltages of the generator. The processing or control system may be configured to receive the operational data directly from the one or more sensors or indirectly via the main control system. The processing or control system may be configured to determine the at least one operating parameter of the energy conversion device, e.g. in real time, and may transmit the operating parameter to the main control unit in order to control operation of the energy conversion device based on the at least one operating parameter or directly control the energy conversion device based on the at least one operating parameter.

The main control unit may be configured to, during use, adjust or control at least one component of the energy conversion device, such as the drive shaft or other drive coupling and/or the generator, and/or the rotor or turbine blades, according to the determined at least one operational parameter (e.g. according to the determined power and/or torque curves). For example, the main control unit may be configured to adjust the rotational speed of the generator or drive shaft or other drive coupling of the turbine to achieve a target power output or torque associated with a measured current rotor or wind or water speed, as indicated by the power or torque vs rotor or wind or water speed control curve.

The speed of the generator may controlled by adjusting a resistant torque which is opposed to the rotational movement of the turbine. Ultimately, the resistant torque may be controlled by a variable load, which may be performed by the power electronic devices connected in between the generator and the grid. The main control unit may continuously adjust the harnessed power, in use, using a feed-back controller, e.g. so the rotor can adjust its speed accordingly.

According to a third aspect of the present invention is an energy conversion device, the energy conversion device comprising one or more drive surfaces provided on or comprised in a movable or rotatable arrangement such that, in use, the one or more drive surfaces are movable or rotatable by fluid flow, such as gas or liquid flow, and a control or processing device according to the second aspect configured to determine at least one parameter of the energy conversion device.

The control or processing device may be or comprise a control device for controlling operation of the energy conversion device. The control or processing device may be or comprise a processing device that is operatively coupled or in communication with, or configured to be coupled to or to communicate with, a control device for controlling operation of the energy conversion device. The at least one parameter may be or comprise at least one operating parameter of the energy conversion device. The control device may be configured to control operation of the energy conversion device using the determined parameter(s) as a control, reference, operating and/or set-point value or range or curve.

The one or more drive surfaces may comprise or be comprised in turbine blades, which may be mounted on, integral with or otherwise coupled to a drive shaft or other drive coupling (such as a chain, belt, prop shaft, etc.). The one or more drive surfaces may be configured such that, in use, flow (such as wind or water or other flow) may be incident on the one or more drive surfaces in order to operate the energy conversion device, e.g. by turning the turbine blades.

The energy conversion device may comprise at least one generator, which may be coupled to, and/or operable by, the drive shaft or other drive coupling. The at least one generator may be configured to convert mechanical energy, e.g. provided to the generator by or via the drive shaft or other drive coupling, to electrical energy. The energy conversion device may comprise a power convertor, which may comprise at least one rectifier stage and/or at least one inverter stage. The energy conversion device may comprise an inverter. The energy conversion device may comprise a filter. The convertor, inverter and/or filter may be configured to convert the electrical output of the generator into an output provided by the energy conversion device, e.g. by one or more of: converting from dc to ac, providing a specified voltage and/or current or voltage range and/or current range, and/or the like.

The energy conversion device may be or comprise or be comprised in a permanent magnet machine. The energy conversion device may be or comprise or be comprised in a double-fed induction machine. The energy conversion device may be or comprise a variable speed energy conversion device. The energy conversion device is preferably but not essentially a direct drive energy conversion device, e.g. the generator is directly driven by the turbine blades via the drive shaft or drive coupling rather than via a gearbox. This arrangement may achieve high efficiency, and may keep a reasonable sized generator.

According to a fourth aspect of the present invention is a computer program product configured to implement the method of the first aspect of the invention when programmed into a control or processing device. The computer program product may be comprised in a carrier medium, which may optionally be a tangible and/or non-transient carrier medium.

According to a fifth aspect of the present invention is a carrier medium, such as a tangible and/or non-transient carrier medium, comprising the computer program product of the fourth aspect.

According to a sixth aspect of the present invention is a method for determining or estimating an aerodynamic or hydrodynamic efficiency of an energy conversion device (or a function thereof) and/or a mechanical loss component, the method comprising:
  (a) Measuring one or more variables of the energy conversion device, which may comprise one or more or each of: generator speed (at the rotor shaft) $\omega_m$, a nacelle wind speed $U_{nacelle}$, a freestream wind speed $U_\infty$, phase currents and/or voltages of the generator, the frequency of the phase voltage at the terminal of the generator (which may be used to estimate the rotor speed);
  (b) Determining one or more losses of the energy conversion device, such as one or more electrical losses;
  (c) Determining an aerodynamic or hydrodynamic efficiency of the energy conversion device that best fits the one or more variables of the energy conversion device and/or the one or more losses of the energy conversion device, e.g. by minimising an error between predicted and measured rotor speed or power.

The method may comprise varying a sampling period or length. The operational data may be collected at sampling periods in the order of seconds or less, for example, less than 20 seconds, e.g. 1 second or less such as 0.5 seconds or less. The sampling period may be in the range from 0.1 to 2 seconds. The operational data may be averaged, e.g. in periods in the order of minutes, such as 1, 10 or 20 minutes or more.

The method may be comprised in or in conjunction with the method of claim 1, e.g. in order to determine aerodynamic or hydrodynamic efficiency.

It should be understood that the features defined above in accordance with any aspect or below in relation to any specific embodiment may be utilised, either alone or in combination with any other defined feature, in any other aspect or embodiment. Furthermore, the present invention is intended to cover apparatus configured to perform any feature described herein in relation to a method and/or a method of using, installing, producing or manufacturing any apparatus feature described herein.

BRIEF DESCRIPTION OF THE DRAWINGS

These and other aspects of the invention will now be described, by way of example only, with reference to the accompanying drawings, in which:
FIG. 21 illustrates losses for each stage or component of a wind turbine that uses a diode rectifier (assuming steady-state) when using the approach according to embodiments of the present invention in which losses are minimised (LMA);
FIG. 22 illustrates comparative losses for each stage or component of a wind turbine that uses a diode rectifier (assuming steady-state) when using the control methodology based on maximising aerodynamic efficiency only (max $C_p$);
FIG. 23 illustrates losses for each stage or component of a wind turbine that uses an active rectifier (assuming steady-state) when using the approach according to embodiments of the present invention in which losses are minimised (LMA);
FIG. 24 illustrates comparative losses for each stage or component of a wind turbine that uses an active rectifier (assuming steady-state) when using the control methodology based on maximising aerodynamic efficiency only (max $C_p$);

DETAILED DESCRIPTION OF DRAWINGS

Maximising yield from energy conversion devices such as wind, tidal and other fluid driven turbines is of significant importance. In a design stage, a wind tunnel or flow chamber is typically used to determine the aerodynamic or hydrodynamic efficiency of the turbine. It is the conventional belief in the art that optimal operation conditions of the turbine are obtained by maximising aerodynamic or hydrodynamic efficiency only. As a result, many turbines are controlled according to a power curve determined from the aerodynamic or hydrodynamic efficiency of the turbine, which can be, for example, determined using a wind tunnel.

Figure 1:
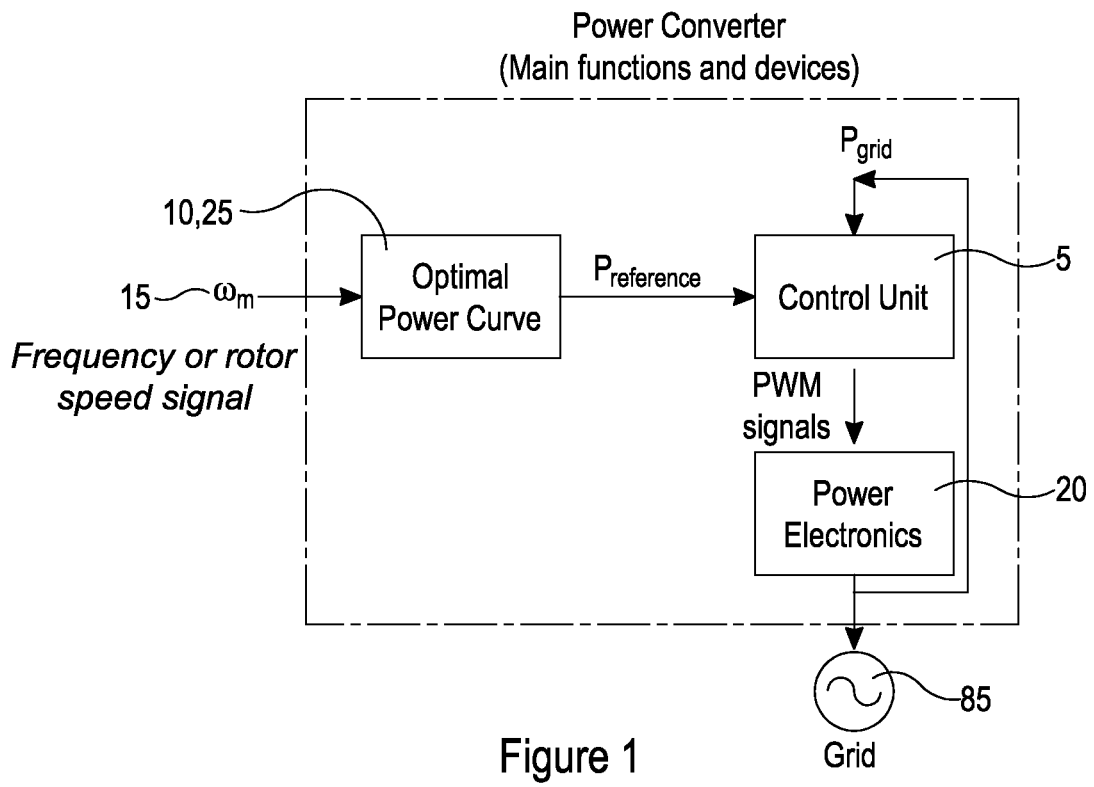
FIG. 1 is a schematic diagram of a control arrangement for a conventional turbine.

As shown in FIG. 1, in this arrangement, a control unit 5 is pre-programmed with a suitable operating parameter map, such as a predetermined power or torque curve 10, e.g. determined from wind tunnel measurements, which is used to control the turbine. The power or torque curve 10 can relate, for example, the dc output power output by a power converter to wind speed or water flow and rotor speed of the turbine. The control unit 5 is provided with or coupled to a drive shaft or rotor rotation speed sensor 15 or a wind speed or water flow sensor and the drive shaft or rotor rotation speed or wind speed or water flow speed collected thereby or data indicative thereof is provided to the control unit 5. In this way, the control unit 5 can control operating parameters of the turbine such as rotor speed, power converter output and the like by correlating the wind speed or water flow measurements to the predetermined operating parameter map (e.g. the power curve 10 or the torque curve) and controlling power electronics 20 of the turbine accordingly. However, it has been found that this form of control is often sub-optimal.

Figure 2:
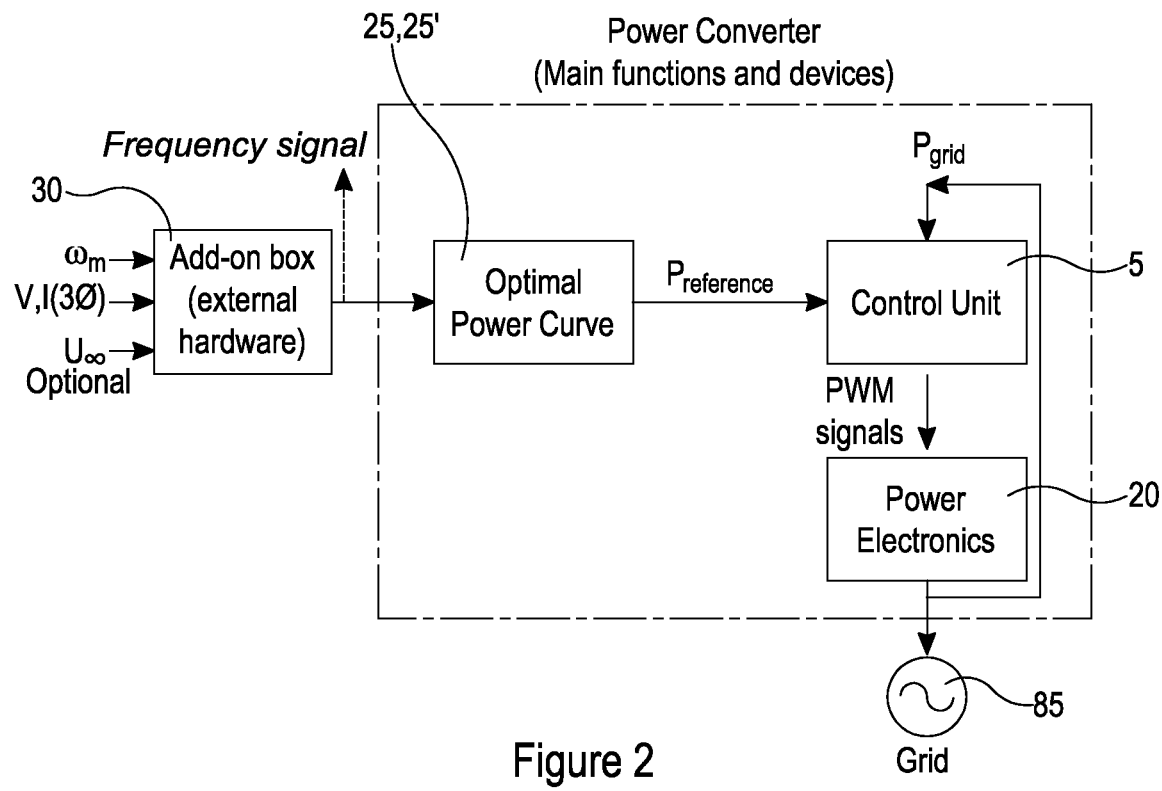
FIG. 2 is a schematic diagram of a control arrangement for a turbine.

An embodiment of the present invention is illustrated in FIG. 2. In this embodiment, the operating parameter maps 25 comprising operating parameters (e.g. power curves, torque curves and/or the like) used to control the operation of an energy conversion device (i.e. the wind, tidal or other flow operated turbine) are not generated by maximising aerodynamic or hydrodynamic efficiency alone, but are instead generated inline by a process that comprises reducing or minimising the losses in the energy conversion device. In preferred embodiments, the operating parameter maps 25 are generated by a combination of maximising or increasing aerodynamic or hydrodynamic efficiency and reducing the losses in the system, e.g. by using a non-linear optimisation algorithm.

The embodiment of FIG. 2 realises this approach by providing a retro-fit arrangement in which an auxiliary control unit 30 is provided, wherein the auxiliary control unit 30 receives various measurement parameters, such as rotor speed of the turbine ($\omega_m$), free-stream wind speed ($U_\infty$), and the output a.c. current (I) and/or voltage (V), and generates, regenerates and/or revises the operating parameter maps 25' based thereon by applying non-linear optimisation algorithms to minimise the losses of the energy conversion device. The revised or generated operating parameter maps 25' are then communicated to an existing main control unit 5. The main control unit 5 then uses the generated or revised operating parameter maps 25' in order to control the operation of the energy conversion device (e.g. the wind, tidal or other flow driven turbine). This arrangement may be particularly beneficial in retro-fitting to existing turbines.

Figure 3:
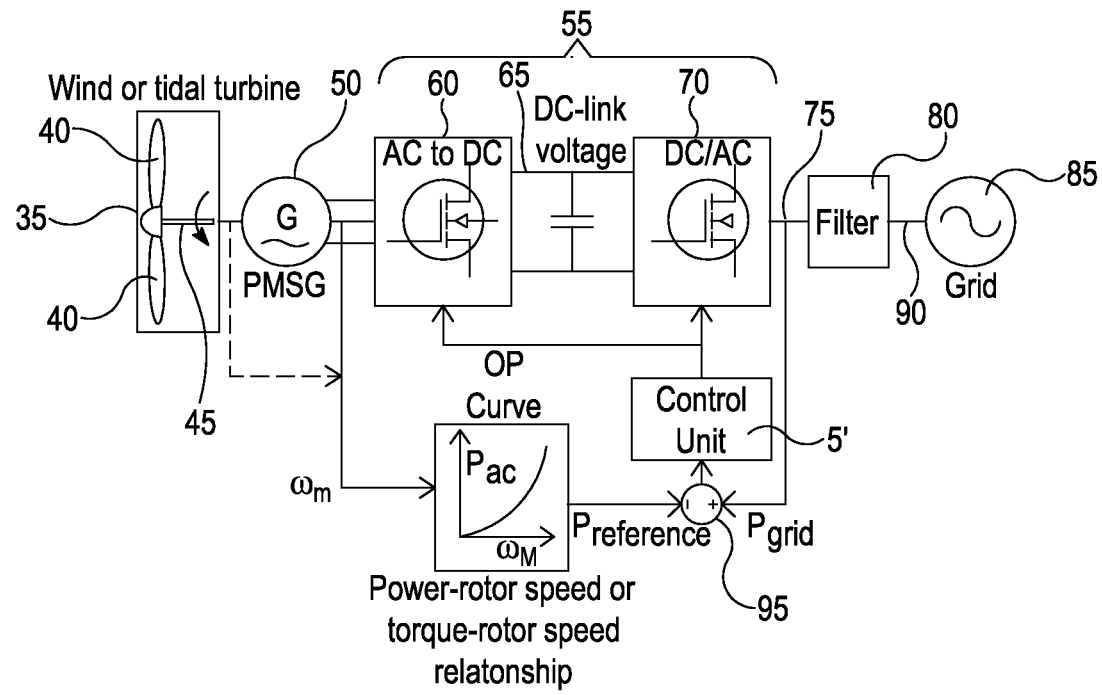
FIG. 3 is a schematic diagram of part of a turbine.

However, it will be appreciated that the main control unit 5' (as shown in FIG. 3) could instead be suitably configured to generate the operating parameter maps such that only a single control unit is required. This arrangement may be more suited to existing control units having a high degree of processing capability, programmability and/or adaptability or to new control units.

FIGS. 2 to 8 will hereafter be described in relation to a wind turbine. However, it will be appreciated that the present invention is equally applicable to tidal or other flow driven turbines or indeed other types or forms of energy conversion devices. It will be appreciated that a skilled person would be able to substitute appropriate parameters such as hydrodynamic efficiency for aerodynamic efficiency, fluid flow speed for wind speed, water density for air density and so on, in order to straightforwardly adapt the following wind turbine related embodiments to tidal or other flow driven turbines or other forms of energy conversion device. As such, the present invention is not limited to wind turbines, but is more widely applicable.

As shown in FIG. 3, the energy conversion device is in the form of a wind turbine comprising a rotor arrangement 35 having a plurality of blades 40 that are coupled to a rotatable drive shaft 45 (although any other suitable turbine rotor arrangement known in the art could be used). The rotor blades 40 are arranged such that, in use, wind incident on drive surfaces of the blades 40 turn the blades 40 and thereby the rotor 35 and rotates the drive shaft 45, as is conventional in art.

The drive shaft 45 is coupled to a generator 50, in this example in the form of a permanent magnet state machine. The generator 50 is operable by rotation of the drive shaft 45 in order to generate an electrical output. The electrical output of the generator 50 is received by a power convertor 55. The power convertor 55 comprises a rectifier 60 that converts the output from the generator 50 into a dc link signal 65. The power convertor 55 further comprises an inverter 70, than converts the rectified dc link signal 65 into an ac signal 75. The ac signal 75 from the inverter 70 is then filtered by a filter 80 and supplied to the grid 85 (or other receiving system or network) as an output signal 90.

Figure 5:
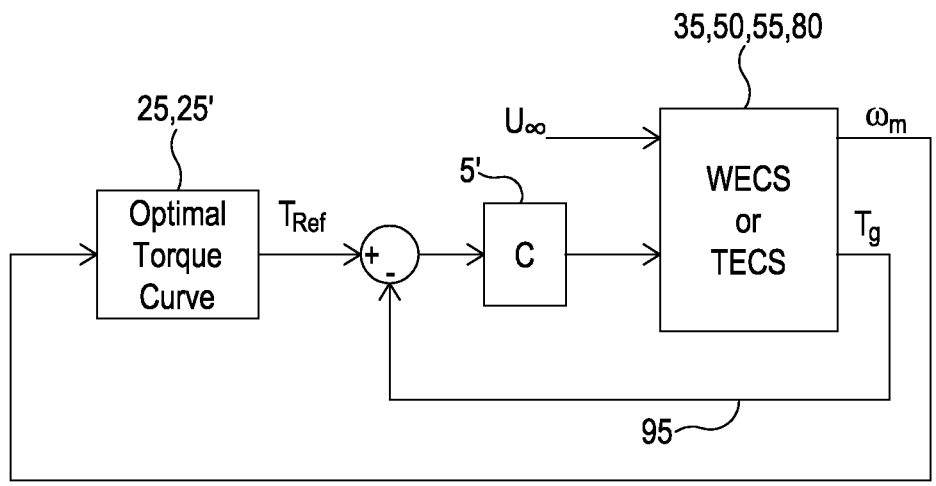
FIG. 5 is a schematic diagram illustrating the functionality of a control arrangement for the turbine of FIG. 3.
Figure 6:
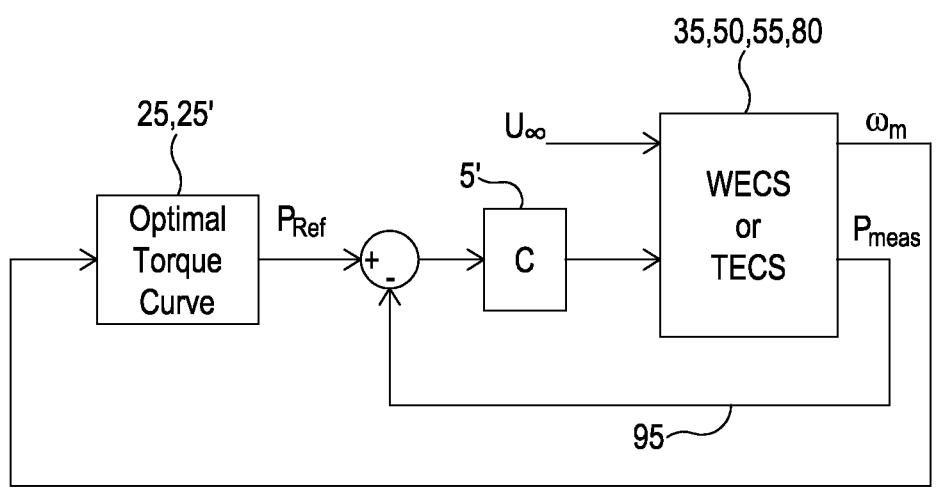
FIG. 6 is a schematic diagram illustrating the functionality of an alternative control arrangement for the turbine of FIG. 3.

The control unit 5, 5' controls the controllable components 50, 60, 70, 80 of the turbine, including ancillary systems of the wind turbine such as the brake (not shown), the gearbox (if fitted) and the power electronics such as the generator 50 and power convertor 55. As indicated above, the control unit 5, 5' controls one or more or each of the controllable components based on the operating parameter map 25, 25' that correlates control parameters used to control one or more of the controllable components 50, 60, 70, 80 with measurement values received by the control unit 5' and/or auxiliary control unit 30, such as rotor speed and the like. In particular, as shown in FIGS. 5 and 6 (which relate respectively to an embodiment in which the control parameter map 25' is a torque curve and an embodiment in which the control parameter map is a power curve), measurements such as free-stream wind speed $U_\infty$, rotor rotational speed $\omega_m$, and output voltage and current (and thereby output power $P_{out}/P_{meas}$) are made, and used to generate the set point torque or power curve, respectively by minimising the overall losses of the energy conversion device, which includes minimising a function of losses associated with each of the components 50, 60, 70, 80. A target power or torque ($P_{ref}$) corresponding to the current measured value of the measurement parameters, such as the rotor rotational speed $\omega_m$, can then be determined from the control parameter map (i.e. set point torque or power curve) 25'. The measured output torque $T_g$ or output power ($P_{meas}$) are then compared to the target torque or power ($P_{ref}$) determined from the current control parameter map (i.e. set point torque or power curve) 25' and operation of the wind turbine is adjusted in order to move the measured output power or torque closer to the set point power or torque using a feedback loop 95.

Figure 4:
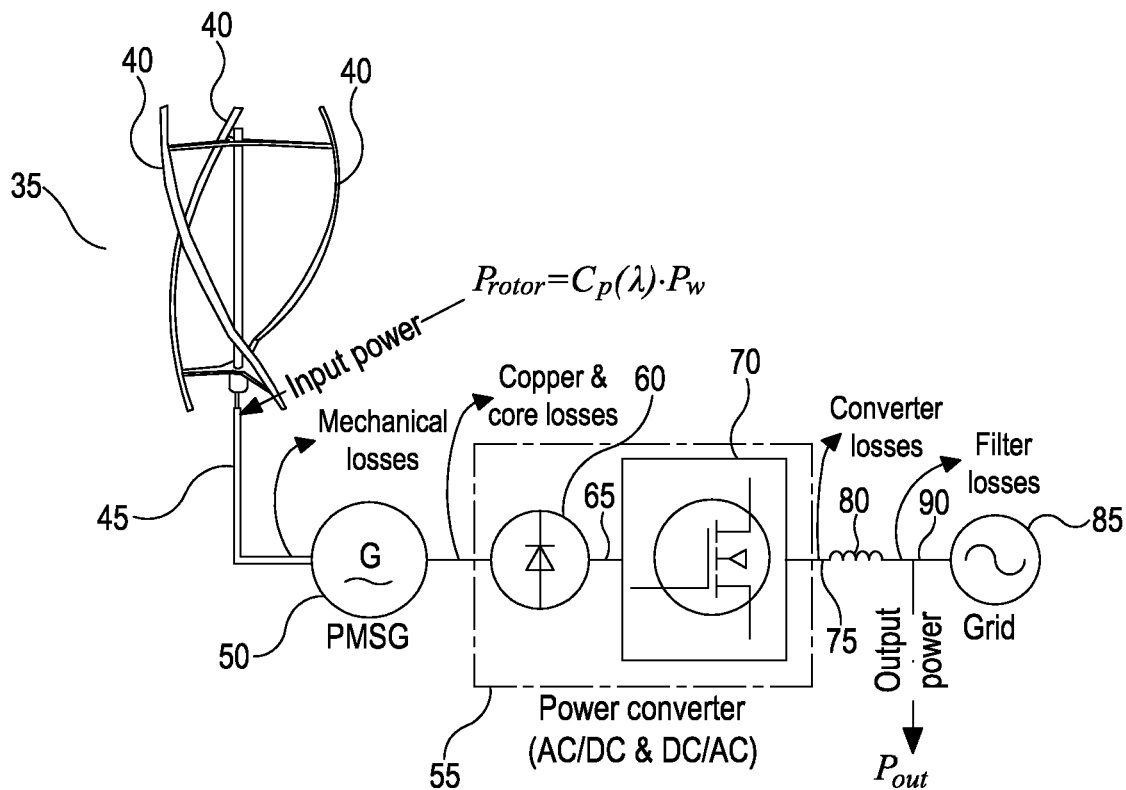
FIG. 4 is a schematic diagram showing losses in the turbine of FIG. 3.
Figure 7:
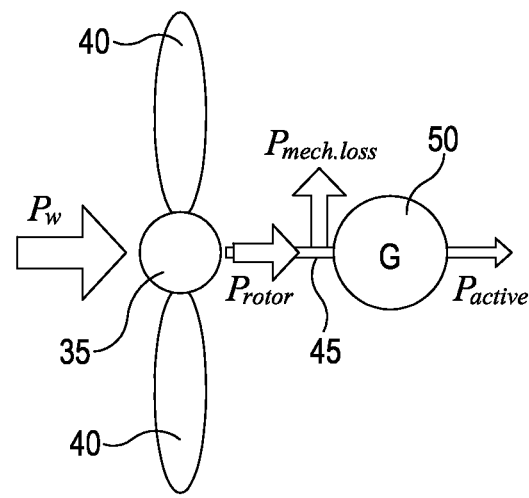
FIG. 7 is an illustration of mechanical losses in the turbine of FIG. 3.
Figure 8:
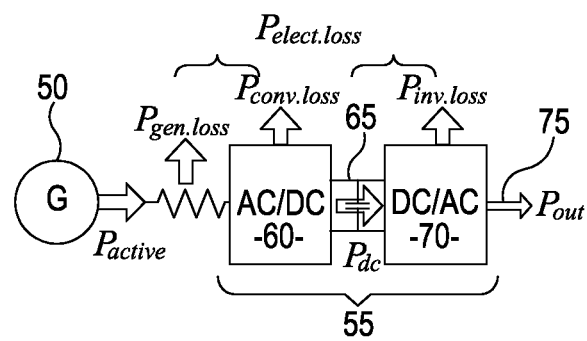
FIG. 8 is an illustration of electrical losses in the turbine of FIG. 3.

As indicated above, the control parameter map 25' is revised or regenerated in use by using a non-linear optimisation method to reduce or minimise losses associated with components of the energy conversion device (preferably in combination with an increased or maximised aerodynamic efficiency) based on the various measurements received by the control unit 5' or auxiliary control unit 30. In particular, the present invention minimises overall losses in the system. Depending on the system, different losses can be more or less significant. For example, the losses can include both mechanical and electrical losses in the turbine, as illustrated in FIGS. 4, 7 and 8. In the particular example shown in FIG. 4, the present invention minimises mechanical losses associated with the rotor arrangement 35, drive shaft 45 and generator 50 and also minimises electrical losses associated with the generator 50, conductors, the power convertor (55) and the filter (80).

The following example described with reference to FIGS. 8 and 9 relates to generation of power curves as forming the operating parameter map 25'. However, it will be appreciated that a similar process can be used to derive torque curves or any other suitable function for forming the operating parameter map 25'.

As shown in FIG. 8, the electrical power ($P_{active}$) output by the generator 50 is equal to the output power ($P_{out}$) less any electrical losses ($P_{elect.loss}$), i.e.:

$$P_{active}=P_{out}+P_{elect.loss}$$

In this case, the electrical losses ($P_{elect.loss}$) are taken to be the sum of the losses of each of the electrical components, i.e. the electrical losses ($P_{elect.loss}$) are equal to the sum of the generator losses ($P_{gen.loss}$), the convertor losses ($P_{conv.loss}$) and the inverter losses ($P_{inv.loss}$):

$$P_{elect.loss}=P_{gen.loss}+P_{conv.loss}+P_{inv.loss}$$

As shown in FIG. 7, considering the above equations for the electrical power ($P_{active}$) output by the generator 50, the output power ($P_{out}$) is equal to the power ($P_{rotor}$) generated by the rotor arrangement 35 under the action of the wind being incident on the blades 40 less the Power ($P_{elect.loss}$) lost due to electrical losses and the power ($P_{mech.loss}$) lost due to mechanical losses. As such:

$$P_{rotor}-P_{elect.loss}-P_{mech.loss}=P_{out}$$

From the above and from FIG. 7, it follows that:

$$P_{rotor}=P_{active}+P_{mech.loss}$$

The active power ($P_{active}$) developed by the generator 50 (before losses) is:

$$P_{active}=3 \cdot E(\omega_m)I_{ph}^{(1)} \cdot \cos(\varphi_{1i})$$

Where $E(\omega_m)$ is the source voltage of the generator in $V_{rms}$, $I_{ph}^{(1)}$ is the fundamental component of phase current, in $A_{rms}$, $\cos(\varphi_{1i})$ is the generator Displacement Power Factor (DPF), and $\varphi_{1i}$ is the angle of displacement of the fundamental frequency between the generator source voltage and the fundamental current, in radians.

The efficiency of the inverter ($\eta_{inv}$) can be obtained from manufacturer's data sheets or from a simulation or parametric model. The term $\eta_{inv}$ includes the efficiency of any step-up stage, inverter 70 and filter 80. The output power ($P_{out}$) is then:

$$P_{out}=\eta_{inv} \cdot V_{dc}I_{dc}$$

Where $V_{dc}$ and $I_{dc}$ are the dc voltage and current input to the inverter 70.

Alternatively, the optimisation can be performed on the dc power output (assuming losses in the inverter 70 are small relative to the other losses, i.e. $\eta_{inv} \approx 1$). In which case, $P_{out}=V_{dc} \cdot I_{dc}$.

In view of the above, the output power ($P_{out}$) for forming the set-point power curves can be determined by solving the following optimisation problem:

Maximise $P_{out}(x)$ subject to:

$$P_{out}(x) \leq P_{rated}$$

$$\omega_m \leq \omega_{max}$$

$$V_{dc} \leq V_{limit}$$

$$P_{rotor}=P_{active}+P_{mech.loss}$$

$$P_{active}-P_{elect.loss}=V_{dc}I_{dc}$$

$$P_{out}=\eta_{inv}(V_{dc},I_{dc},P_{out}) \cdot V_{dc}I_{dc}$$

where $x=[V_{dc}, I_{dc}, \omega_m]$, $P_{rated}$ is the rated power from the inverter, $\omega_{max}$ is the brake limit speed from the wind turbine, and $V_{limit}$ is the maximum voltage allowed by the inverter.

It will be appreciated that this is a constrained, non-linear and multi-variable optimisation problem. There are a range of techniques for solving such problems available in the art, and it will be appreciated that a skilled person may select a suitable technique from amongst the various techniques available in the art and apply it to the current problem, by applying routine knowledge and skill in the art to the teachings of the present application.

However, by way of illustration, one approach for solving this would be to use the MATLAB™ function fmincon from the Optimisation Toolbox. This function attempts to maximise $P_{out}$ starting from an initial estimate by using the interior-point algorithm. The use of an approximate but sub-optimal solution as the initial estimate (such as an initial estimate obtained based only on aerodynamic considerations, e.g. from wind tunnel derived data or the like) helps accelerate the solution to the problem and helps ensure identification of the global maximum.

The final solution also depends on the topology of the rectifier 60. Examples of rectifiers 60 that could be used include a passive rectifier, 60a such as that shown in FIG. 9, or an active rectifier 60b, such as that shown in FIG. 11.

Figure 9:
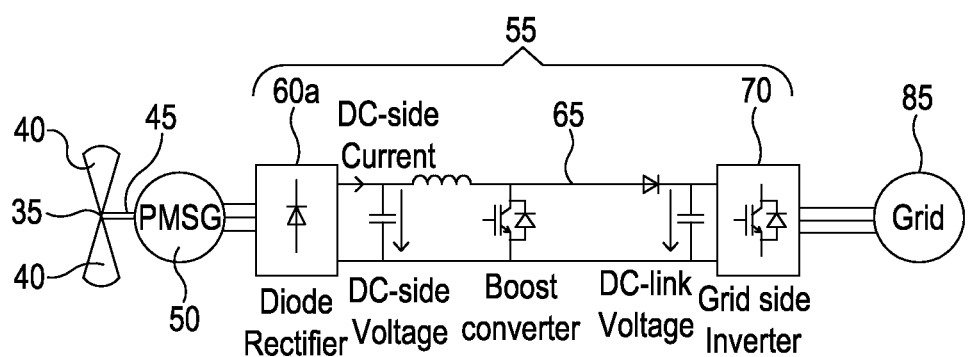
FIG. 9 is an illustration of a turbine comprising a passive rectifier.

For embodiments in which a passive rectifier 60a is used, such as that shown in FIG. 9, $\cos(\varphi_{1t}) \neq 1$, so the DFP is another variable that needs to be found by power balancing.

The output of a three-phase full-bridge diode rectifier can be obtained as:

$$V_{dc} = \frac{3\sqrt{2}}{\pi} V_{LL} - \frac{3}{\pi} \omega_e L_s I_{dc}$$

Where $V_{LL}$ is the phase-to-phase voltage of the generator (rms value); $\omega_e$ is the electric angular frequency ($\omega_m$p, where p is the pole pair number), and $L_s$ is the phase equivalent inductance.

Figure 10:
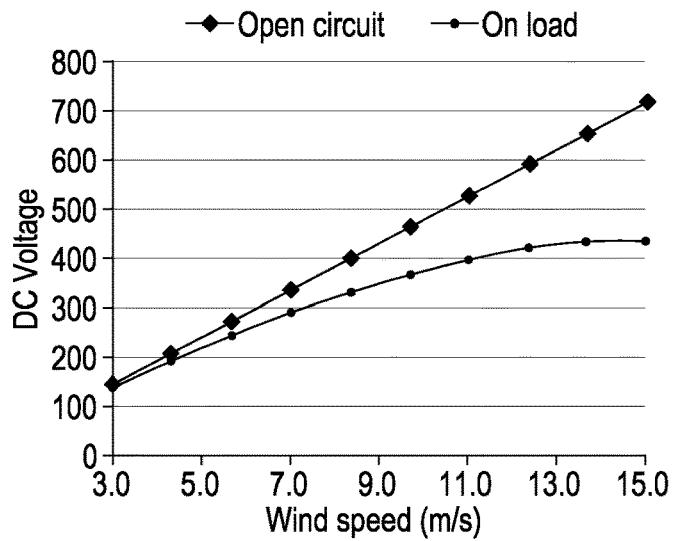
FIG. 10 is a graph of a DC output voltage estimation of the turbine of FIG. 9 illustrating voltage drop to resistive and iron core losses.

However, this approach does not account for a drop in voltage due to copper and iron losses. These can be significant, as can be seen by the difference between the open circuit and on-load voltages illustrated in FIG. 10.

An additional term can be added to account for the copper/iron losses:

$$V_{dc} = \frac{3\sqrt{2}}{\pi} V_{LL} - \frac{3}{\pi} \omega_e L_s I_{dc} - 3R_{ph} I_{dc} \frac{\sqrt{6}}{\pi} - 2V_{diode}$$

The dc current ($I_{dc}$) just after the diode rectifier 60a is related to the phase current (rms) $I_{ph}$ by:

$$I_{ph} = \frac{\sqrt{6}}{3} I_{dc}$$

The electrical losses ($P_{elect.loss}$) can be segregated into three components, namely losses ($P_{gen.loss}$) in the generator 50, losses ($P_{conv.loss}$) in the power converter 55 and losses ($P_{inv.loss}$) in the filter 80:

$$P_{elect.loss} = P_{gen.loss} + P_{conv.loss} + P_{inv.loss}$$

The losses ($P_{gen.loss}$) in the generator 50 result from adding copper losses, core losses ($P_{core.loss}$), and eddy current losses ($P_{eddy}$) in the windings:

$$P_{gen.loss} = 3I_{ph}^2 R_{Cu} + P_{core.loss} + P_{eddy}$$

Where $R_{Cu}$ is the copper resistance.

With regard to the converter losses, on the diodes, conduction loss $P_{CD}$ is the dominant term due to the voltage drop $v_{DO}$ and a very low resistive term $r_D$. At 50 Hz, the switching losses are about 1.2% of $P_{CD}$ and so can be generally neglected below that frequency. Therefore:

$$P_{conv.loss} \approx P_{CD} = 2v_{DO} \cdot I_{dc} + 3r_D \cdot \frac{I_{ph}^2}{2}$$

Figure 11:
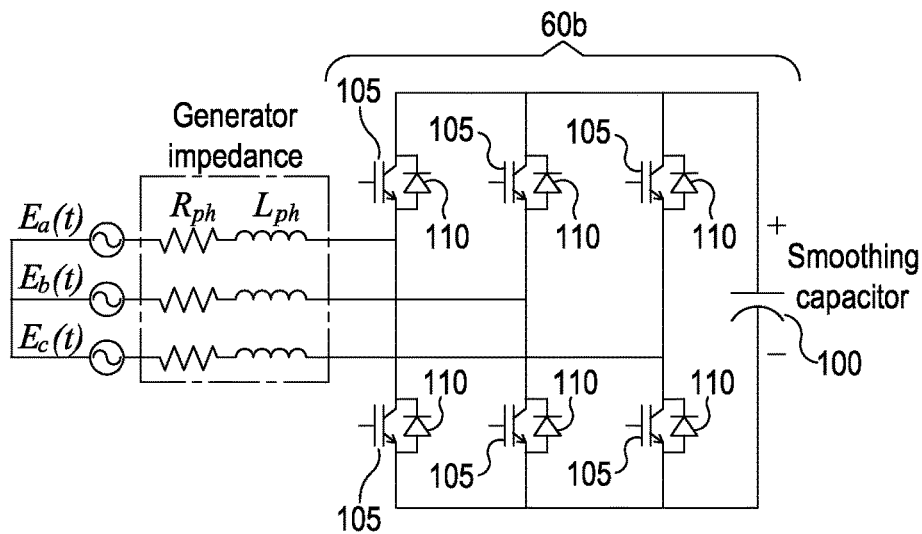
FIG. 11 is a schematic of an active rectifier for use in a turbine.
Figure 12:
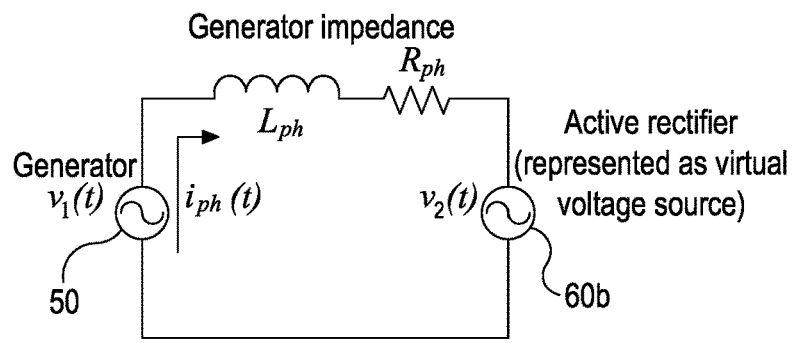
FIG. 12 is an equivalent circuit for modelling the active rectifier of FIG. 11 combined with a generator.

In another embodiment, an active rectifier 60b, such as an active rectifier 60b operated as a voltage source converter (VSC) can be used. In this case, the active rectifier 60b aims to control the dc voltage at the outputs of the terminal of the rectifier 60b. Although this voltage can be constant, it is better to adjust it, in order to maximise efficiency. The VSC also requires a smoothing capacitor 100 to filter the ripple components in the voltage and power output. A schematic of a suitable six-switch active rectifier 60b is shown in FIGS. 11 and 12. The rectifier 60b comprises six insulated gate bipolar transistors (IGBTs) 105 arranged in pairs, with each pair being arranged in parallel to the other pairs and also to the smoothing capacitor 100. Each phase $E_a(t)$, $E_b(t)$, $E_c(t)$ of the generator 50 is connected to a respective node between a respective pair of IGBTs 105.

The interaction between the generator ($v_1(t)$ in FIG. 12) and the active rectifier 65b, can be modelled as a single-phase circuit where two voltage sources ($V_1(t)$, $V_2(t)$) are placed together, separated by an impedance $R_{ph}$, and sharing a power flow. The generator sees the converter 55 as a sinusoidal source ($v_2(t)$). Ultimately, the phase angle and magnitude of $v_2$ are controlled externally by the switching of the IGBTs 105.

In FIG. 11, $v_1(t)$ is the fundamental component of the phase voltage of generator 50; $i_{ph}(t)$ is a fundamental component of the phase current (in the active rectifier $I_{ph} \approx I_{ph}^{(1)}$); $v_2(t)$ is the fundamental component of the phase voltage virtually produced by the active rectifier 60b; $L_{ph}$ is a phase equivalent inductance; $R_{ph}$ is the phase equivalent resistance (combining copper and core loss in one term) and $\omega_e$ is the electric frequency (rad/s).

The magnitude of the generator source is given as:

$$|V_1| = \omega_e \frac{\lambda_{PM}}{\sqrt{2}}$$

Where $\lambda_{PM}$ is the flux linkage produced by the permanent magnets of the generator 50.

In addition:

$$|V_2| = \frac{m_{index} V_{dc}}{2\sqrt{2}}$$

Where $V_{dc}$ is the output voltage on the smoothing capacitor 100 and $m_{index}$ is the modulation index. This equation is valid for $m_{index} < 1$.

This equation can be modified to account for the voltage drop from the resistive term and from the switches (i.e. the IGBTs 105), resulting in:

$$V_{DC} = (|V_1| - |I_{dc}|R_{ph}) \cdot \frac{2\sqrt{2}}{m_{index}} - 2v_{CEO}$$

where $V_{CEO}$ is the voltage drop on the switches (IGBTs 105).

Relationships for a unity displacement power factor can be derived. The following uses phasor notation (magnitude in rms and angle in radians), assuming a steady state regime and only fundamental components;

$$v_1(t) = \sqrt{2}|V_1|\cos(\omega_e t + \theta_1)$$

$$v_2(t) = \sqrt{2}|V_2|\cos(\omega_e t + \theta_2)$$

$$i_{ph}(t) = \sqrt{2}|I_{ph}|(\omega_e t + \theta_i)$$

$$Z_{eq} = R_{ph} + j\omega_e L_{ph} = R_{ph} + jX_{ph}$$

FIG. 12 shows a simplified equivalent circuit to that of FIG. 11. From this, the voltage seen by the active rectifier 60b/$V_2(t)$ is the generator voltage $V_1(t)$ minus the drop of voltage in the impedance term ($Z_{eq}$):

$$\dot{V}_2 = \dot{V}_1 - R_{ph}\dot{I}_{ph} - jX_{ph}\dot{I}_{ph}$$

The aim is to operate the generator 50 at maximum efficiency, thus DPF≈1 (although voltage limits should be met. Therefore, at some point, a flux weakening strategy needs to be used. Since phase current $I_{ph}$ and generator voltage need to be in phase, $\theta_{1i}=0 \Rightarrow \theta_i=\theta_1$. For the sake of simplicity, the angle of the generator source $50/V_1(t)$ is set to be zero ($\theta_i=\theta_1=0$).

By dividing the above equation out into real and complex parts and applying the above goals and assumptions, it is possible to derive a relationship that can be used to determine the angle of the virtual source $V_2(t)$ representing the active rectifier 60b required to achieve unity DPF, as follows:

$$\tan(\theta_2) = \frac{-|I_{dc}|X_{ph}}{|V_1| - R_{ph}|I_{dc}|}$$

Satisfying this condition of maximum efficiency in the generator 50 may mean that $V_{dc}$ is higher than in the diode rectifier case. However, the modulation index $m_{index}$ is usually operated below the over-modulation zone to avoid harmonic distortion. The may be a trade-off between DPF and modulation index. However, there is a control algorithm known as Space Vector Modulation (SVM), that ultimately allows $m_{index}^{max} \approx 1.1547$. This enables a reduction of $V_{dc}$ without introducing additional harmonics.

The losses in the power switches 105 of an active rectifier circuit 60b are mainly due to conduction and switching losses. Assuming that the modulation function of the insulated gate bipolar transistors (IGBTs) 105 is sinusoidal, then the conduction losses ($P_{CT}$) in the IGBTs 105v can be estimated using:

$$P_{CT} = 6 \cdot \left( v_{CEO} \sqrt{2} I_{rms} \left( \frac{0.5}{\pi} + \frac{m_{index} \cos(\phi_{1i})}{8} \right) + r_c \cdot (\sqrt{2} I_{rms})^2 \cdot \left( \frac{1}{8} + \frac{m_{index} \cos(\phi_{1i})}{3\pi} \right) \right)$$

Where $V_{CEO}$ is the collector-emitter on-state voltage (at zero-current), and $r_c$ is the collector-emitter on-resistance.

Similarly, in the anti-parallel diodes 110 of the active rectifier 60b, the conduction losses ($P_{CD}$) are:

$$P_{CD} = 6 \cdot \left( v_{DO} \sqrt{2} I_{rms} \left( \frac{0.5}{\pi} + \frac{m_{index} \cos(\phi_{1i})}{8} \right) + r_D \cdot (\sqrt{2} I_{rms})^2 \cdot \left( \frac{1}{8} + \frac{m_{index} \cos(\phi_{1i})}{3\pi} \right) \right)$$

where $v_{DO}$ is the diode forward voltage (at zero-current) and $r_D$ the conductance resistance.

The switching losses ($P_{switching.loss}$) can be calculated using:

$$P_{switching.loss} = 6 \cdot f_s (E_{ON,T} + E_{OFF,T} + E_{OFF,D}) \cdot \frac{V_{dc} I_{dc}}{P_{refLoss}}$$

Where $f_s$ is the switching frequency of the IGBTs 105, $E_{ON,T}$ and $E_{OFF,T}$ are the switching energies of the IGBTs 105, $E_{OFF,D}$ is the turn-off energy of the anti-parallel diodes 110, and $P_{refLoss}=V_{ref}I_{ref}$ is a loss given by the manufacturer. Information on the switching energies is provided in the data-sheets of the semiconductors used.

The total converter 55 losses ($P_{conv.loss}$) can be found by simply adding the conduction losses ($P_{CT}$) in the IGBTs 105, the conduction losses ($P_{CD}$) in the diodes 110 and the switching losses ($P_{switching.loss}$), which can be in turn determined using the above equations, or by other techniques that may be apparent to a person skilled in the art.

In other words:

$$P_{conv.loss} = P_{CT} + P_{CD} + P_{switching.loss}$$

These converter losses for a converter 55 having an active rectifier 60b can be factored in to the overall loss minimisation algorithm and a numerical solution can be found, for example, using the methods described above in relation to the passive rectifier 60a.

Figure 13:
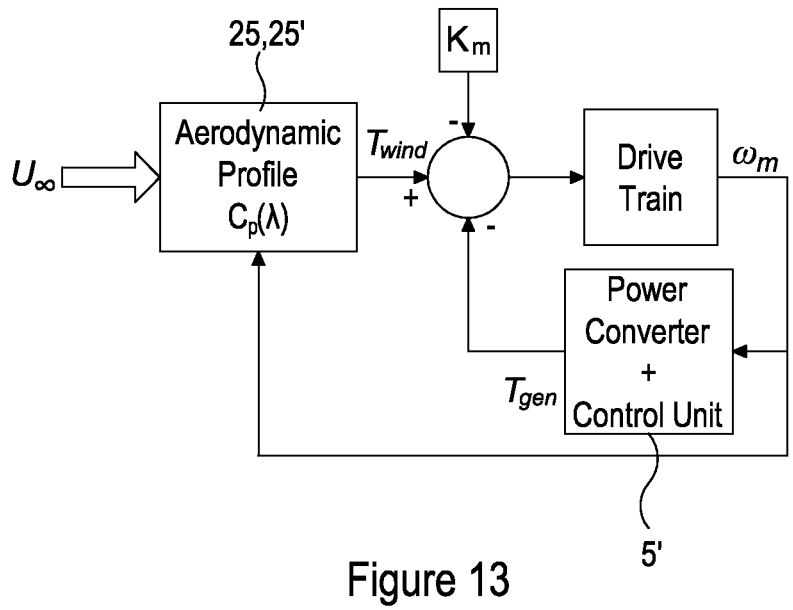
FIG. 13 is a simplified model of a wind turbine, as an example of an energy conversion device.

The control unit 5' or auxiliary control unit 30 is configured to determine mechanical losses $P_{mech}$ in the energy conversion device (i.e. the wind turbine in this example, but also applicable to other energy conversion devices). An example of an approach for accounting for mechanical losses and aerodynamic efficiency (or hydrodynamic efficiency for fluid/water based turbines) is outlined below with reference to FIG. 13, which shows a simplified model of the mechanical parts of the wind turbine.

The control device of the present invention takes into account aerodynamic efficiency (or hydrodynamic efficiency as the case may be). The aerodynamic efficiency can be approximated by an exponential or a polynomial function. An example of a suitable exponential function for approximating the aerodynamic efficiency ($C_p$) as a function of the tip-speed ($\lambda$) is:

$$C_p(\lambda) = (k_1 \lambda - k_2) \cdot e^{-k_3 \lambda}$$

The selection of the parameters has to be done in order to have a concave (or quasiconcave) function. The fitting function used has to be general enough to model accurately the drag region. A non-limiting example of this is provided below.

By keeping $k_3 > 0$, then $C_p \to 0$ when $\lambda \to \infty$. In addition, the optimal point is determined by derivation and equating to zero, i.e.

$$\frac{dC_p}{d\lambda} = 0.$$

The optimum tip speed $\lambda^{opt}$ is given by:

$$\lambda^{opt} = \frac{1}{k_3} + \frac{k_2}{k_1}$$

By evaluating the value of $\lambda^{opt}$ into the preceding equation for $C_p(\lambda)$ and assuming that the function is positive in the optimum $k_1 \lambda^{opt} - k_2 > 0$, it follows that:

$$k_1 > k_3, k_1 > 0$$

These additional constraints simplify the estimation of $C_p$-$\lambda$, i.e. the aerodynamic efficiency as a function of the blade tip-speed ratio.

Table 1 below provides exemplary values used to generate aerodynamic profiles:

TABLE 1

Parameters of an exemplary Aerodynamic Profile

| Template function | $k_1$ | $k_2$ | $k_3$ | $\lambda^{opt}$ | $C_p^{opt}$ | Error (MSE) | $R^2$ |
|---|---|---|---|---|---|---|---|
| Exponential | 6.524 | 0.969 | 4.173 | 0.388 | 0.309 | $1.658 \times 10^{-4}$ | 0.809 |
| $2^{nd}$-order polynomial | −2.191 | 1.791 | −0.058 | 0.409 | 0.309 | $1.850 \times 10^{-4}$ | 0.784 |

When selecting which type of expression to use, it has been found that using the exponential function better models the drag region, whilst a polynomial function models the stall region more accurately. However, since the present loss minimisation method tends to accelerate the turbine over the tip speed predicted on the basis of aerodynamic efficiency alone, it is preferable to opt for better modelling of the drag region, and thereby the exponential function given above may be preferred, at least for some applications.

Since rotation of the blades 40 causes a large variation in the angle of attack on the blades 40 during each turn. As a result, the input torque to the rotor arrangement 35 tends to oscillate. As such, the approach taken with embodiments of the present invention is to consider an averaged aerodynamic efficiency $C_p$ taken over, e.g. one revolution.

In the present exemplary embodiment, the wind turbine is a direct drive turbine, i.e. it does not comprise a gearbox (although it will be appreciated that gearbox based devices could be used and that a skilled person could adapt the following derivation accordingly).

The drive train is modelled according to a dynamic equation of a spring-damping system of first order as follows:

$$T_{wind} - T_{gen} - K_m = J\frac{d\omega_m}{dt} + B\omega_m$$

where $T_{wind}$ is the input torque in the rotor arrangement 35

$$\left(T_{wind} = \frac{P_{rotor}}{\omega_m}\right),$$

$T_{gen}$ is the resistant torque developed by the generator 50, $K_m$ represents the mechanical loss (assumed to be a constant), J is the moment of inertia of the generator 50 plus the turbine, and B is the friction damping coefficient.

The inertia J can be determined by techniques known in the art, e.g. by using CAD modelling.

By applying the Laplace transform to the above equation, it can be shown that:

$$H(s) = \frac{\Omega_m(s)}{\sum T(s)} = \frac{1}{Js + B}$$

H(s) is the transfer function of the drive train. B can often be assumed to be very low or negligible if the shaft is very stiff.

The system must be time responsive. That is, when the wind changes, there may be inertia in the mechanical response of the system or a lag in the electrical response of components such as in the inverter 70.

As an auxiliary approach when bandwidth is an issue, a feed forward term, such as that described in "On Optimizing the Transient Load of Variable-Speed Wind Energy Conversion System During the MPP Tracking Process" by Chen et. al., IEEE Transactions on Industrial Electronics, page 4698, Vol. 61, No. 9, September 2014 (particularly in section IV.B) and in "Baseline Results and Future Plans for the NREL Controls Advanced Research Turbine", L. J. Fingersh and K. E. Johnson, 23rd *ASME Wind Energy Symposium Reno, Nev., Jan.* 5-8, 2004, can be used to improve the bandwidth and therefore the responsiveness of the system. The feed forward term can be obtained from the estimation of the input power or torque from the wind as explained in the above paper by Chen et. al.

The control unit is operable to perform a non-linear optimisation on a function that comprises losses from a plurality of components and preferably from each significant component, i.e. each component whose losses are non-negligible or relatively insignificant. The losses include both mechanical losses and electrical losses. The function also comprises aerodynamic (or hydrodynamic, as applicable) efficiency. Since the function is generally in the form of a term representing the power extracted by the turbine based on aerodynamic or hydrodynamic efficiency less the plurality of losses due to the active components of the turbine (including both mechanical and electrical losses), the optimisation generally comprises a reduction or minimisation of the losses.

Figure 14:
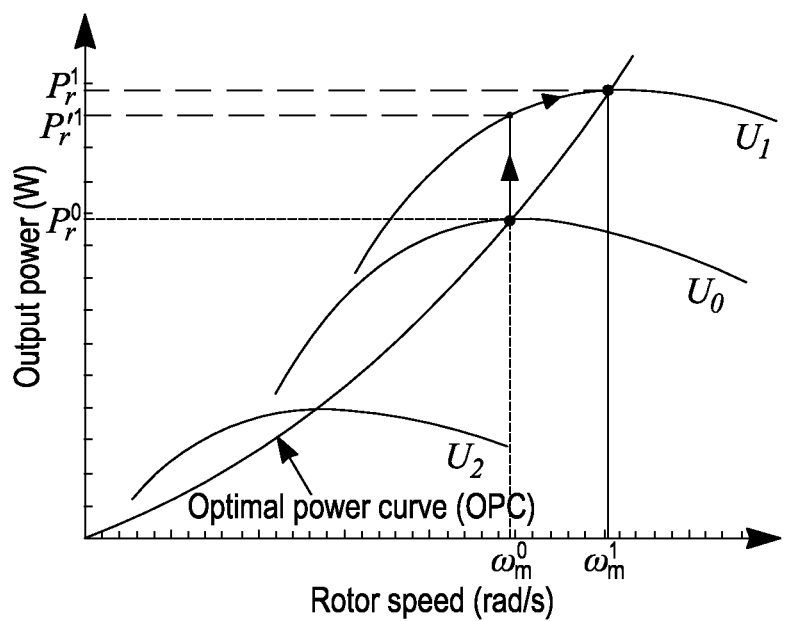
FIG. 14 is an illustration of output power vs speed curves for varying wind speed, as output by the control and processing system of embodiments of the present invention.

The non-linear optimisation results in the operating parameter map 25', typically in the form of power (or torque or other suitable control parameter) curves that specify the variation in optimum or target output power ($P_{out}$) with rotor speed ($\omega_m$) for a range of various wind speeds (U) or rotor speeds, from which an optimal power curve can be determined. An example of such a control parameter map based on power curves is shown in FIG. 14.

In this way, for example, the control unit 5' or auxiliary control unit 30 can determine the optimum, target or set point output power for any given measured wind or rotor speed and adjust the rotor speed (or other operating parameter of the energy conversion device) accordingly, e.g. by controlling operation of the generator or other active load. The operating parameter map 25' (e.g. the power or torque curves) can be calculated or recalculated in use, e.g. on the fly or during operation, and used to generate or revise the current operating parameter map 25' if required.

Advantageously, since the control unit 5' or auxiliary control unit 30 of embodiments of the present invention effectively calculates and/or recalculates operating parameter maps 25' (e.g. set point or optimum power-rotor speed curves or torque-rotor speed curves), which can be substituted for the pre-determined or otherwise calculated control parameter maps 25 used by existing turbines, the present system can not only advantageously improve performance of the energy conversion device (e.g. wind or water turbine) but may also be easily retro-fittable to existing turbines.

It will be appreciated that various mathematical expressions for the various losses and the aerodynamic or hydrodynamic efficiencies are described above. However, it will be appreciated that these are merely exemplary, and that a skilled person, with knowledge of the teaching of the present application, readily identify other formulae or techniques for determining one or more or each of the losses, aerodynamic or hydrodynamic efficiencies or other terms described herein. A skilled person need not even take the theoretical approaches described above and may, for example, use experimental or modelled data, computation modelling (e.g. by using CFD or CAD or finite element or other techniques known to a person skilled in the art) or by using outputs from sensors or by using values obtained from similar, model or prototype devices in use or in a wind tunnel, and/or the like.

An example of a loss minimisation in the steady state is now presented. This uses the equations for determining the losses, including the mechanical losses and electrical losses identified above. In particular, the exponential function referred to above is used to estimate the aerodynamic efficiency curve as a function of tip speed ratio ($C_p$-$\lambda$).

A computational fluid dynamics (CFD) model and experimental testing on a scaled physical model were used to determine a maximum aerodynamic efficiency $C_p^{max}$ for a given tip speed ratio $\lambda$. Measured output dc power and the losses estimated for the generator 50 and converter 55 were also used to estimate a measured aerodynamic efficiency $C_p^{measured}$, although this could also have been determined by measurements on the drive shaft 45, in use. The mechanical loss is assumed to be constant within the operational speeds of the turbine. The peak aerodynamic efficiency was estimated to be 0.27, although it is expected for larger turbines that the peak aerodynamic efficiency will be above 0.45.

Figure 15:
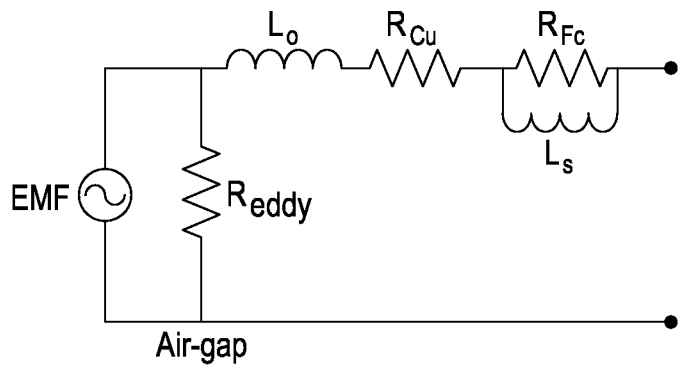
FIG. 15 shows an equivalent circuit for a Permanent Magnet air cored Synchronous generator.

An equivalent circuit shown in FIG. 15 is used to describe an embodiment of the energy conversion device in the form of a wind turbine in which the generator 50 is an air-cored generator based on ferrite magnets. Losses for the generator 50 are determined as described above but additionally accounting for thermal effects.

The air-cored axial-flux generator 50 uses ferrite instead of Neodymium magnets. The resistivity of ferrite magnets is very high compared to Neodymium magnets, therefore eddy current losses in the rotor arrangement 35 only occur in the iron supporting the magnets. However, a typical wind turbine based on a permanent magnet synchronous generator (PMSG) will have Neodymium magnets instead of ferrites. Therefore losses in the magnets will be more significant. An impedance test can be performed on the generator 50 in order to determine the core resistance $R_{Fe}$ and inductance. The EMF of the generator 50 can also be determined using the analytical model. In this embodiment, the generator 50 (i.e. a permanent magnet machine) has forty poles and eight coils per phase. The 1st space harmonic from the flux reaction seen by the rotor occurs at a frequency $f_B$ given by:

$$f_B = f_e\left(1 + \frac{NoCoilsperPhase}{NoPairPoles}\right) = f_e \cdot \frac{7}{5}$$

Where $f_e$ is the fundamental electric frequency.

Unlike the copper resistance, the core equivalent term $R_{Fe}$ in FIG. 15 depends mainly on the rotor speed. Relatively small temperature changes do not affect the iron conductivity (i.e. between 0 to 100° C.).

In the modelled generator 50, the thermal effects on the windings have a subtle impact. The temperature rise $\Delta T$ in the windings can be obtained from the linear relationship between temperature and resistance (at normal temperatures), such that:

$$R_f = R_a(1 + \Delta T \cdot a_{cu})$$

Where $R_f$ is the final resistance ($\Omega$);
$a_{cu} = (T_a + k_{Cu})^{-1}$ (temperature coefficient of resistance, in 1/° C.);
$R_a$, $T_a$ are the ambient resistance (in $\omega$) and temperature (in ° C.),
$k_{Cu}$=234.5 (in ° C.), inferred absolute temperature.
In addition, as $$q = \frac{\Delta T}{R_{th}},$$

where q denotes power dissipation or heat source (in this case $P_{Loss}$), the steady-state value of the copper resistance is deduced from:

$$R_f = R_a(1 + R_{th} P_{loss} a_{Cu})$$

$R_{th}$ is the equivalent thermal resistance from the windings to air (in ° C./W), and $P_{Loss}$ is the total loss dissipated in the windings. The thermal resistance changes with rotor speed, as the heat transfer improves at higher speeds (the magnet protuberances act like a cooling fan).

A low power test (160W) was performed, running the energy conversion device for more than 50 minutes at constant speed and load, and the thermal characteristics were estimated there from, as shown in Table 2 below. These results were extrapolated at higher power and speeds using empirical correlations. The thermal variation of the copper coils was estimated from an indirect measurement of resistance using the above equations, whereas $R_{th}$ was estimated using the above equations. Ideally, this experiment should be done at different speeds and higher output load, in order to improve confidence in the values.

The results obtained from the measurements and the parameters determined therefrom are shown in Table 2 below:

TABLE 2

Summary of the results and parameters computed therefrom, obtained from an experimental test at 6.6 rpm.

| Measured values | | | | | Estimated values | |
|---|---|---|---|---|---|---|
| $P_{Loss}$ (W) | $T_a$ (° C.) | $R_a$ ($\Omega$) | $R_f$ ($\Omega$) | $\alpha_{Cu}$ | $\Delta T$ (° C.) (from Eq. 5.48) | $R_{th}$ (° C./W) (from Eq. 5.49) |
| 10.24 | 13.90 | 11.08 | 11.23 | 4.03 × 10$^{-3}$ | 3.3 | 0.32 |

The extrapolation of the results uses an assumption that $R_{th}$, which depends on rotor speed, can be estimated using the Nussel Number Nu' being inversely proportionate to the thermal resistance, i.e.:

$$R_{th} = \frac{1}{\hat{k} Nu'}$$

Where $\hat{k}$ is a proportional constant.

The Nussel number Nu' is the ratio of convective to conductive heat transfer across the boundary of a surface within a fluid. Empirical correlations for air-cored machines with surface mounted magnets are known from the art. The dimensions of the generator 50 can be used in these estimations to calculate the Reynolds $Re_e$ and Nussel number Nu'. In an enclosed rotor, the rotating magnets emulate a fan improving the heat transfer coefficient of the windings. Applying the above mentioned correlations known in the art, it can be determined that:

$$Nu' = 0.0008 \cdot Re_e + 188.74$$

From the above equations, the steady state value of $R_f$ and the power loss in the windings can be determined.

However, for all of the thermal parameters described herein, the relevant thermal parameters could be estimated on the fly/in use using temperature sensors inside the electrical generator.

The loss minimisation algorithm also accounts for losses in a passive rectifier 60a. In particular, in an embodiment of the energy conversion device (e.g. a wind turbine), a diode rectifier 60a is connected at the output terminals of the generator 50. The equations described above can be used to calculate phase and dc currents, rotor speed, DPF, dc voltage, dc power, and ac output power. The loss minimisation algorithm of the present invention is used to maximise the ac output power.

In addition, the inverter 70 includes a step-up dc/dc converter that indirectly regulates the dc voltage by controlling the power injected to the grid. This inverter 70 is modelled using an efficiency map based on published curves from the manufacturer, and experimental measurements at low power.

Figure 16:
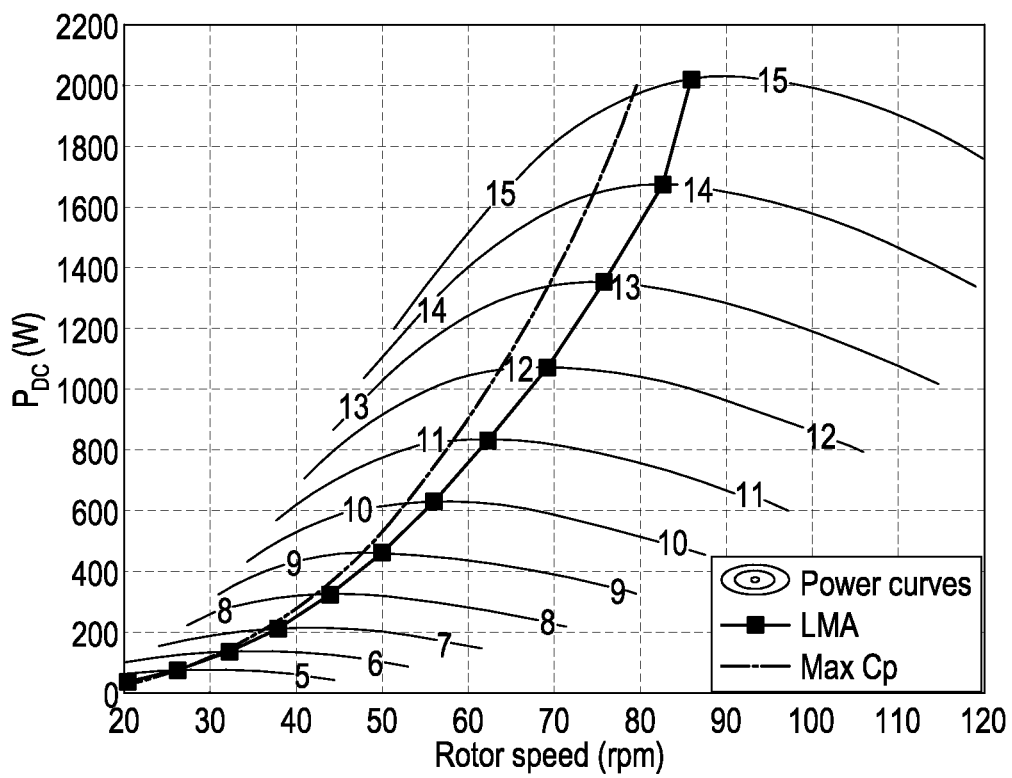
FIG. 16 shows predicted power curves for a wind turbine, generator and diode rectifier for various wind speeds.

FIG. 16 shows power curves for the energy conversion device (i.e. the wind turbine), according to rotor and wind speed.

These curves are produced using the following inputs:
the electrical machine parameters such as: no-load voltage, coil resistance, inductance, rotor core resistance, mechanical loss, diode voltage drop; and
the Cp-λ curve of the wind turbine.

Maximum aerodynamic efficiency (the dashed line in FIG. 16) does not achieve optimal power, whereas the solid line determined by using the loss minimisation algorithm described above reaches the optimum until the loss minimisation algorithm becomes constrained by a mechanical speed limit imposed by the centrifugal brake (not shown) of the turbine (86 rpm in this example).

In particular, FIG. 16 shows a predicted power curve for wind turbine plus generator 50 and diode rectifier 60a. The wind speed varies from 4 to 15 m/s. The dashed line represents the maximum aerodynamic efficiency (Max Cp) curve, which differs from the global optimum represented by the solid line obtained by using the loss minimisation algorithm described above. This difference is more significant at higher wind speeds.

Figure 17:
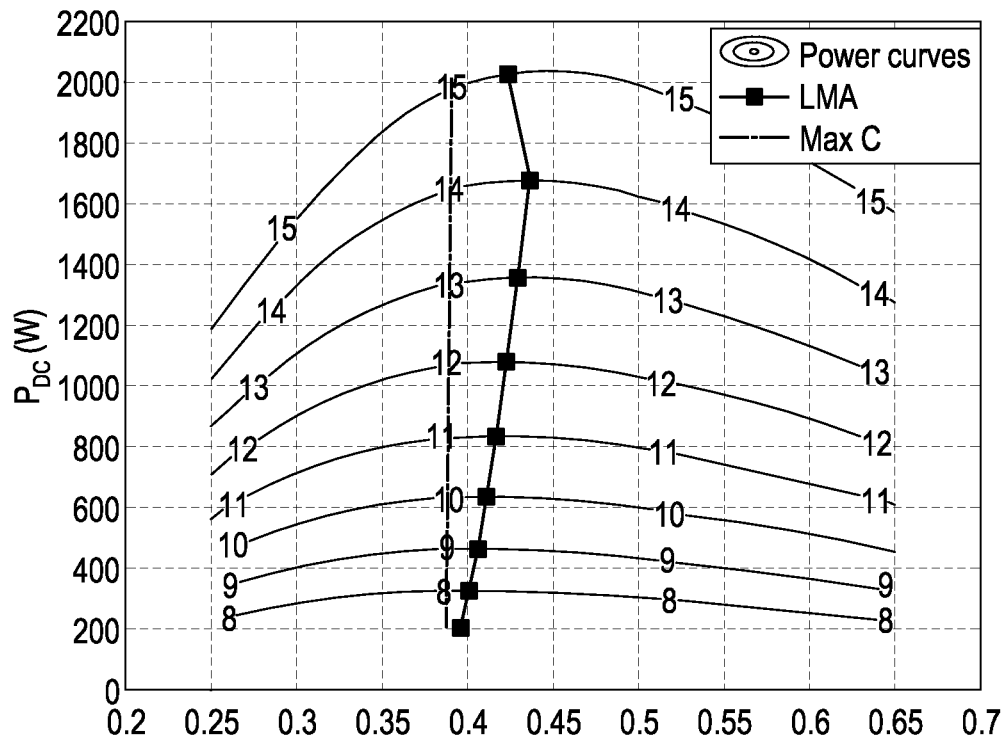
FIG. 17 shows curves of power output vs tip speed ratio for various wind speeds and showing a comparison of a control methodology based on maximising aerodynamic efficiency only (max $C_p$) and an approach according to embodiments of the present invention in which losses are minimised (LMA)

FIG. 17 shows power output vs tip speed ratio TSR, according to wind speed. It can be seen from this that the loss minimisation algorithm described above (solid line) reduces the system losses by slightly accelerating the turbine (i.e. increasing λ).

Figure 18:
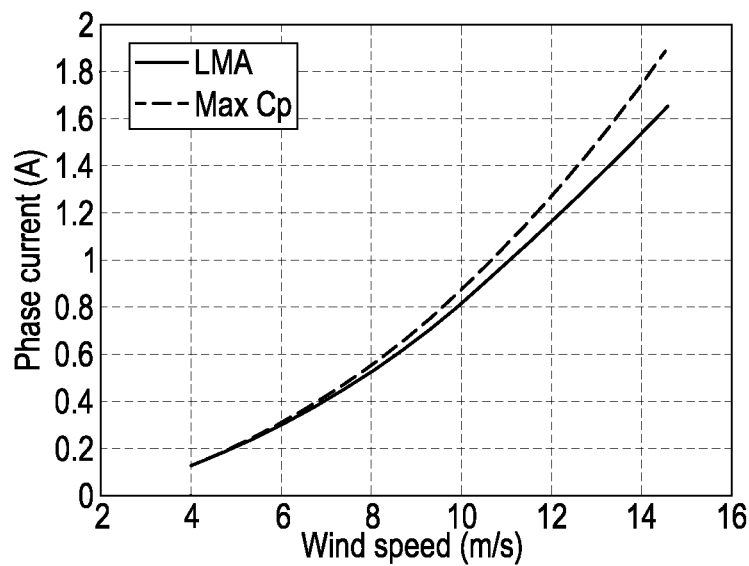
FIG. 18 shows the variation of phase current in one of the phases of a wind turbine with wind speed when using a control methodology based on maximising aerodynamic efficiency only (max $C_p$) and an approach according to embodiments of the present invention in which losses are minimised (LMA)

The loss minimisation algorithm accelerates the generator 50 above $\lambda^{opt}$ determined from the aerodynamic efficiency alone to reduce the phase current, as can be seen from FIG. 18. As a result, the copper and iron losses are also reduced until the mechanical loss increases too much (this last term is proportional to rotor speed). By accelerating the rotor, the input power is lowered, allowing the resistant torque $T_{gen}$ to decrease. Surprisingly, the turbine is taking less power from the wind in order to minimise its losses and increase output power. The power increment is particularly significant at very high winds (e.g. above 12 m/s for this particular exemplary embodiment.

The above loss minimisation algorithm is constrained by the mechanical brake, and by the inverter 70, to a maximum power output of 2.2 kW (in this particular embodiment/example). Theoretically, its efficiency at maximum load is about 96.3%. Therefore the limit in power injected on the dc side is 2.29 kW (at 16 m/s). In addition, the inverter 70 operates between 90 and 500 V at the dc input. The upper limit is not reached due to voltage drop at high loads; however, the lower bound imposes a constraint that requires the turbine to operate with λ>0.4 at low wind speeds. Thus, the Max-Cp strategy only produces power above 3.4 m/s, whereas use of the above loss minimisation algorithm can potentially result in power production starting at 2 m/s. The system can also maximise $P_{dc}$ instead of $P_{out}$, however the results are similar.

Figure 19:
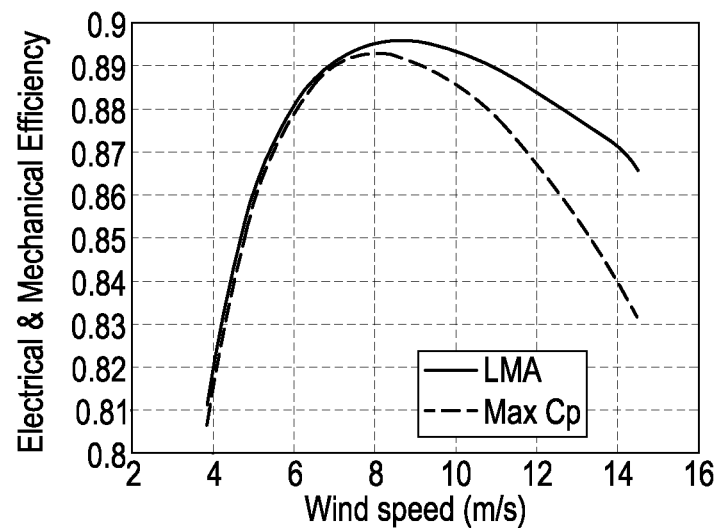
FIG. 19 shows variations in efficiency from a rotor to a DC stage of a wind turbine with wind speed when using the control methodology based on maximising aerodynamic efficiency only (max $C_p$) and the approach according to embodiments of the present invention in which losses are minimised (LMA)
Figure 20:
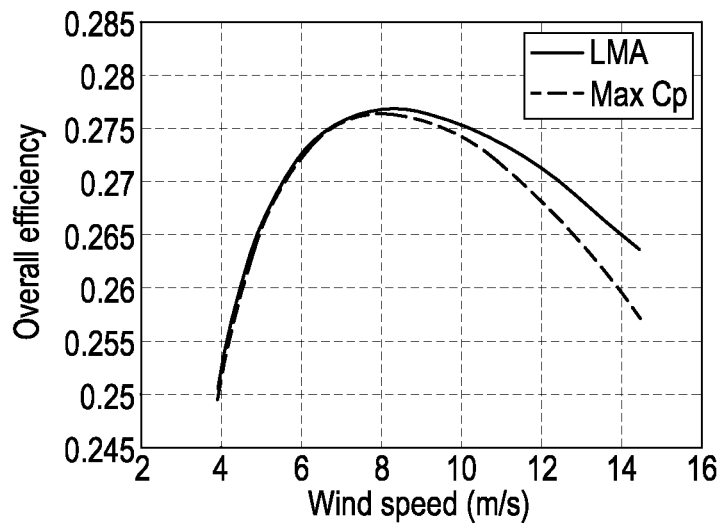
FIG. 20 shows variations in overall efficiency of a wind turbine with wind speed when using the control methodology based on maximising aerodynamic efficiency only (max $C_p$) and the approach according to embodiments of the present invention in which losses are minimised (LMA)

FIG. 19 shows the variation in efficiency for all components between the rotor arrangement 35 and the DC stage with wind speed. As can be seen from FIG. 19, the electrical system (generator 50 plus diode rectifier 60a) exhibits efficiencies above 80% for wind speeds between 4 and 10 m/s, reaching a peak of almost 90%. FIG. 20 shows the variation in overall efficiency (i.e. from wind to dc output) with wind speed. From this, it can be seen that the overall efficiency is above 25%, with a peak of 28% at a wind speed of 8 m/s.

FIG. 21 shows a loss breakdown of electrical and mechanical losses of a system that uses a diode rectifier 60a (assuming steady-state) obtained by using the loss minimisation technique described above in relation to the present invention. From this, it can be seen that that the dominant term is the copper loss, whilst diode losses are very small. Iron losses are significant above 12 m/s. Below 6 m/s the dominant term is the mechanical loss. Use of the loss minimisation technique described above enables the generator 50 to operate with a relatively good Displacement Power Factor (DPF) of between 0.93 and 0.95.

FIG. 22 shows a comparative loss breakdown when the same system is operated by maximising aerodynamic efficiency alone, as is conventional in the art. From a comparison of FIG. 22 with FIG. 21, it can be seen that, at 15 m/s for example, a reduction of around 15% in total losses is achieved by using the loss minimisation approach described above over maximising aerodynamic efficiency alone.

The loss minimisation technique described above has been trialed on working test turbines at different sites having different average wind speeds in comparison to operating the test turbines using conventional methods in which only the aerodynamic efficiencies are maximised (max-$C_p$ methods). The difference in terms of improved performance in the trial ranges from 1.7% for the site with highest mean wind speed (MS); to about 5.5% for the site with lowest mean wind speed (MS). A 5.5% of improvement the site with lowest mean wind speed is because the loss minimisation algorithm results in the turbine kicking-in on lower winds (starting from 2 m/s) relative to operating the same turbine using methods that maximise aerodynamic efficiency alone.

It has been found that integrating the loss minimisation techniques described above with stall regulation can result in significant increases in annual energy output, for example of between 6.3% and 16.4% in the above trial sites, depending on location and average wind speed.

In the above examples, on an annual basis, it has been found that the copper loss is dominant, whereas diode loss ($P_{conv.loss}$) is negligible. The loss minimisation algorithm described above reduces copper loss relative to convention control schemes based on maximising aerodynamic efficiency alone from 9.4 to 6.7%, by reducing the resistant torque. However, both mechanical and iron losses are slightly increased because of this. Since the loss minimisation technique described above performs a global minimisation, i.e. it accounts for both mechanical and electrical losses for each significant component from the rotor arrangement 35 to the electrical output ($P_{out}$), the total losses can be effectively minimised, even when this involves minimising the most significant losses, e.g. copper losses in this case, even if some less significant losses are increased (e.g. mechanical and iron losses in this case). However, as detailed above, the dominant losses may vary depending on factors such as the wind speed, the turbine design and so on.

The above analysis applies to turbines that use a diode (passive) rectifier 60a. The loss minimisation approach described above has also been analysed in relation to turbines that use an active rectifier 60b.

Additionally, at lower wind speeds, the output power increment is higher compared to the diode (passive) rectifier 60a case. However, this improvement has a very low impact on the overall system.

FIG. 23 shows a loss breakdown for an energy conversion device in the form of a wind turbine that uses an active rectifier 60b (assuming steady state) when using the technique described above that uses a global loss minimisation algorithm that takes into account aerodynamic efficiency. FIG. 24 shows a comparative loss breakdown when an otherwise identical turbine to that used to generate FIG. 23 is operated using a conventional technique in which the system is based on maximising aerodynamic efficiency alone. In this case, a comparison of FIG. 22 with FIG. 23 shows that, at 15 m/s for example, the losses are reduced by more than 50W (9%). At 11 m/s for example, the loss reduction is less than 5 W.

In terms of annual energy output, combining the loss minimisation approach (LMA) detailed above with a stall-regulation feature could be more relevant in a windy site, as it can boost power output by about 8% (particularly in sites where the mean wind speed is greater than 5.5 m/s). However, this feature may require additional hardware. For instance, the stall regulation could be implemented using current control based on measurements of the output current using an appropriate output current sensor which are fed back to the control unit 5' or auxiliary control unit 30 to achieve improved stability in the stall region, or by using a wind speed measurement collected using a wind speed sensor in the control loop.

It will be appreciated that the loss minimisation technique described above is particularly beneficial as it does not require any modification to hardware and can be implemented by upgrading the control software in an existing turbine control unit 5, 5'. However, the implementation of the loss minimisation technique in combination with stall regulation, although more beneficial in terms of annual energy output improvements, would require some hardware modification, e.g. provision of output current or wind speed sensors whose outputs are fed back to the control unit 5' or auxiliary control unit 30.

The operating parameter map 25' in the form of the optimal or control power curve delivered by the above loss minimisation algorithm is inserted in the closed-control loop (see e.g. FIGS. 5 and 6) of the turbine control unit 5' and/or auxiliary control unit 30, e.g. in place of the previous or preset optimal or control power curve 25, such as that determined by using maximum aerodynamic efficiency techniques. This results in an improvement in the efficiency of the turbine when operated according to the new control power curve 25'. In this way, by measuring rotor speed or wind speed, the control unit 5' or auxiliary control unit 30/control unit 5 combination can adjust the output power $P_{out}$ to suit the measured rotor speed based on the new optimal or control power curve 25'. Optionally, the loss minimisation algorithm can be subsequently re-run over time and/or in use in order to regenerate or adjust the optimal or control power curve 25', e.g. to take into account any differences or variations in the system such as due to changes in average wind speed or changes, e.g. degradation, of components over time and/or the like.

In summary, the loss minimisation algorithm described above finds a global optimum (i.e. taking into account the losses of each significant individual component of the energy conversion device between the rotor and the electrical output of the energy conversion device, including at least the mechanical losses of the energy conversion device and electrical losses due to at least the generator 50 and/or the power convertor 55 and preferably also the filter 80). The revised operating parameter map 25 in the form of an optimal power or torque curve is obtained by solving numerically the electrical equations for a steady-state system, taking into account the mechanical and electrical losses. This methodology has been validated using steady-state and transient simulations, combined with real wind data.

The concept, proved on an exemplary test wind energy convertor, improved overall efficiency by between 1.7 and 5.5%, depending on local wind conditions. In addition, this methodology does not require extra hardware, so it can be implemented by retro-fitting in commercial inverters with little effort, i.e. it may only require a software upgrade in an existing control unit 5 or connection of an auxiliary control unit 30 to implement the loss minimisation algorithm, which in turn simply updates the operating parameter map in the form of the target output power or torque vs rotor or wind-speed control curves used by the control unit 5, 5' to control operation of the energy conversion device.

Determination of the time constant of the wind energy conversion device combined with the Power spectrum density (PSD) of the wind, allows assessment of whether a particular design can successfully track the commanded optimal power curve, in unsteady wind conditions. In higher turbulence (e.g. free stream turbulence intensity (FTI)>0.26) the control unit may need to accelerate the response of the dynamic system, by adding an estimation of input torque, or a wind speed measurement, as suggested in "On Optimizing the Transient Load of Variable-Speed Wind Energy Conversion System During the MPP Tracking Process" by Chen et. al., IEEE Transactions on Industrial Electronics, page 4698, Vol. 61, No. 9, September 2014.

Figure 25:
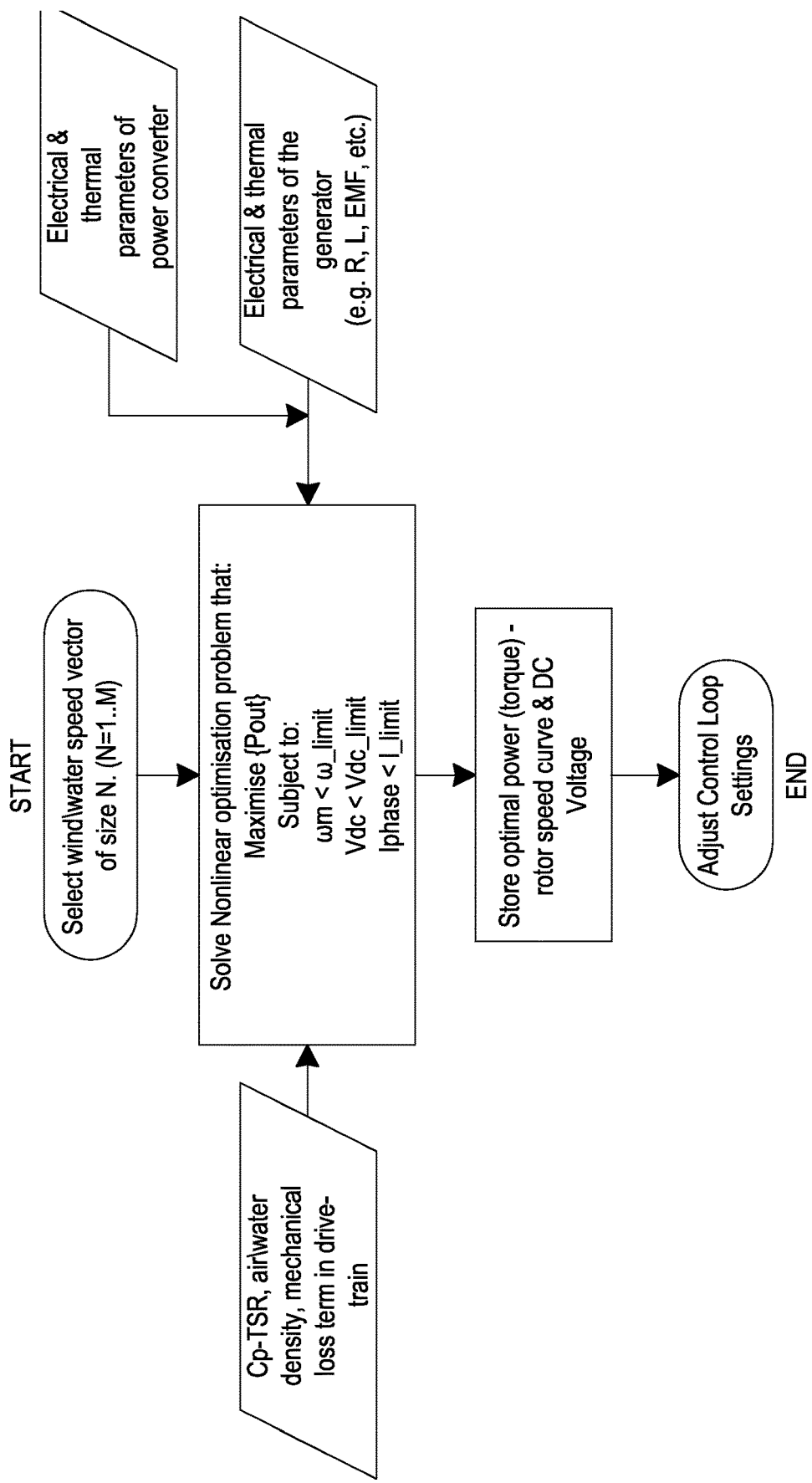
FIG. 25 is a flow diagram of a method for calculating a control parameter for a turbine, the control parameter being in the form of an optimal power\torque vs rotor speed curve.

The approach using the loss minimisation algorithm is summarised in FIG. 25, which shows a flowchart of an embodiment of the process. In this case, a wind or water speed vector is selected and input to the control unit 5' or auxiliary control unit 30. Mechanical and aerodynamic or hydrodynamic parameters such as the hydrodynamic or aerodynamic efficiency ($C_p$) curve as a function ($C_p$-λ) of the tip-speed ratio (TSR) (λ), air/water density, mechanical losses in the drive train and the like are also made available to the control unit 5' or auxiliary control unit 30. Electrical and thermal parameters of the power convertor 55 and the generator 50 (e.g. inductance, resistance, EMF and the like of the power convertor 55 and generator 50) are also made available to the control unit 5' or auxiliary control unit 30. It will be appreciated that the various parameters may be pre-stored in a suitable data storage device or memory and/or provided to the system over a communications system/network and/or the like.

Using these parameters, the control unit 5' or auxiliary control unit 30 is configured to solve a series of non-linear equations that maximise the (electrical) power output $P_{out}$ from the energy conversion device subject to a series of limitations or boundary conditions, including the angular frequency of rotor speed ($\omega_m$) being less than a pre-set maximum limit ($\omega\_limit$), the dc voltage output from the rectifier ($V_{dc}$) being less than a maximum limit ($V_{dc\_limit}$), and the phase current ($I_{phase}$) being less than a maximum limit ($I_{phase\_max}$). Particularly, the non-linear equations reflect the hydrodynamic or aerodynamic efficiency ($C_p$) curve as a function of the tip-speed ratio ($\lambda$) less the overall (i.e. global) mechanical and electrical losses in several and preferably each of the significant components between the turbine rotor and the electrical output, including at least the mechanical losses in the rotor arrangement 35, drive shaft 45 and generator 50 and the electrical losses due to at least the generator 50 and power convertor 55 and preferably also the filter 80. The maximisation of the electrical power output ($P_{out}$) thus maximises the hydrodynamic or aerodynamic efficiency ($C_p$) whilst minimising the global/overall losses.

The above optimisation/output power maximisation may be carried out using various suitable equations to describe the system components and/or be based on measurements, modelling, test rigs, manufacturers datasheets, theoretical approaches and/or the like.

The above optimisation/output power maximisation produces replacement operating parameter maps 25', such as target power output (or torque) to rotor or wind or water speed control curves, that are used by the control unit 5, 5' to determine a target or set point for operating the energy conversion device (i.e. the wind or tidal turbine) depending on the rotor, wind or water flow speed. The control loop used by the control unit 5, 5' can then be adjusted to reflect the new operating parameter maps 25', i.e. the new target/control power or torque to wind or water speed curves.

The approach described above based on loss minimisation uses at least three sets of inputs, namely:
1. the aerodynamic (or hydrodynamic) parameters of the turbine (denoted as $k_1$, $k_2$ and $k_3$), and a mechanical loss term ($K_m$), which can be used to determine the aerodynamic (or hydrodynamic efficiency);
2. the parameters of the generator 50 such as no-load voltage, phase resistance, core loss, inductance and thermal characteristics, which can be used to determine the electrical losses of the generator 50, and
3. the converter 55 parameters such as diode voltage drop, and their conductivity resistance, which can be used to determine the losses of the converter 55.

The second set of parameters (i.e. 2 above) can be estimated using an analytical approach, as described above, or by making appropriate measurements, e.g. static measurements, on the generator 50 and other components. Thus, for example, the parameters can be determined on a test rig without the need for a wind tunnel.

The third set of parameters (i.e. 3 above) can be determined from manufacturer data sheets or by using a test rig or the like.

However, in order to achieve the best results, the minimisation of losses needs to be combined with a consideration of the aerodynamic parameters/efficiencies. Failure to take into account aerodynamic effects or errors in their estimation may negatively impact the resulting performance of the energy conversion device.

Beneficial approaches for estimating aerodynamic parameters of the wind turbine (and maximising the aerodynamic efficiency) are provided below. It will be appreciated that these are not only applicable to the loss minimisation approach described above, but may also be applied separately in conventional approaches that maximise or optimise aerodynamic or hydrodynamic efficiency alone, e.g. in order to determine a power or torque curve (or other operating parameter map) that is associated with the maximised or optimised aerodynamic or hydrodynamic efficiency. The determined power or torque curve (or other operating parameter map) can then be used to control the operation of the energy conversion device (e.g. by controlling operation of the rotor, generator and/or an active load of the energy conversion device) in order to achieve the output power or torque for a measured rotor or wind or water speed using the determined power or torque curve (or other operating parameter map).

These approaches estimate the aerodynamic parameters of the wind turbine by deriving a reference model and using the sensed wind, and estimated rotor speed or dc power. An optimisation routine finds the values of $k_1$, $k_2$, $k_3$, and $K_m$, minimising the error of rotor speed.

The input torque from the wind $T_{wind}$ cannot be directly measured on the shaft. Due to the constantly variant rotor speed, the resistant torque is different from $T_{wind}$. However, $T_{wind}$ can be estimated from wind, voltage, current and rotor speed measurements, by combining analytical and numerical methods.

Figure 26:
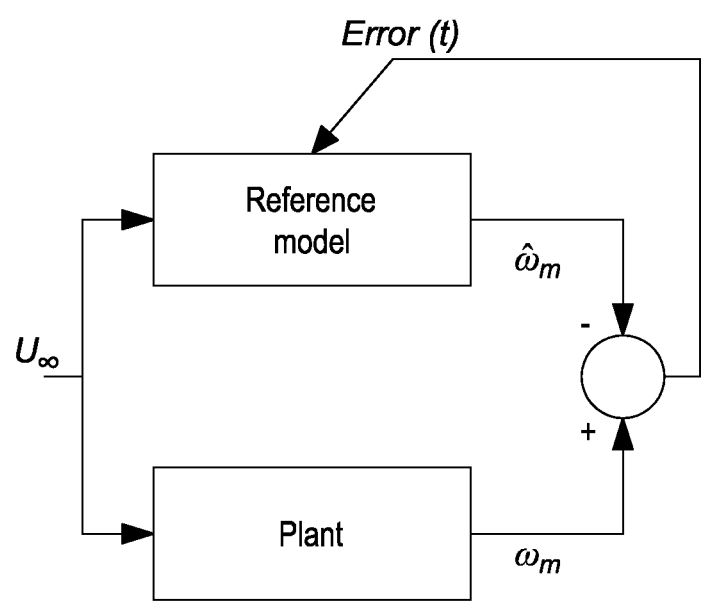
FIG. 26 is a model used to estimate input torque from the wind.

FIG. 26 shows a model of the energy conversion device. In the exemplary methods for determining aerodynamic efficiency described below, the aerodynamic or hydrodynamic parameters can be estimated by minimising the output error (Error(t)).

The resistant torque developed by the generator $T_{gen}$ can be estimated from the following equation:

$$\hat{T}_{gen} \approx \frac{V_{dc}I_{dc} + P_{gen.loss} + P_{conv.loss}}{\omega_m}$$

Thus, from FIG. 26, the two unknown inputs are mechanical loss and the rotor input torque from wind ($T_{wind}$), besides the coefficients of the drive-train.

Also:

$$T_{wind} = \frac{P_{rotor}}{\omega_m}$$

Where $P_{rotor}$ is the rotor input power from wind and $W_m$ is the angular frequency of rotor speed.

Therefore, it is possible to create a reference model of adjustable parameters, until the norm of the error between measured and estimated rotor speed in FIG. 26 is minimised:

$$\sum_{t=0}^{N} |\hat{\omega}_m(t) - \omega_m(t)|^2$$

Figure 27:
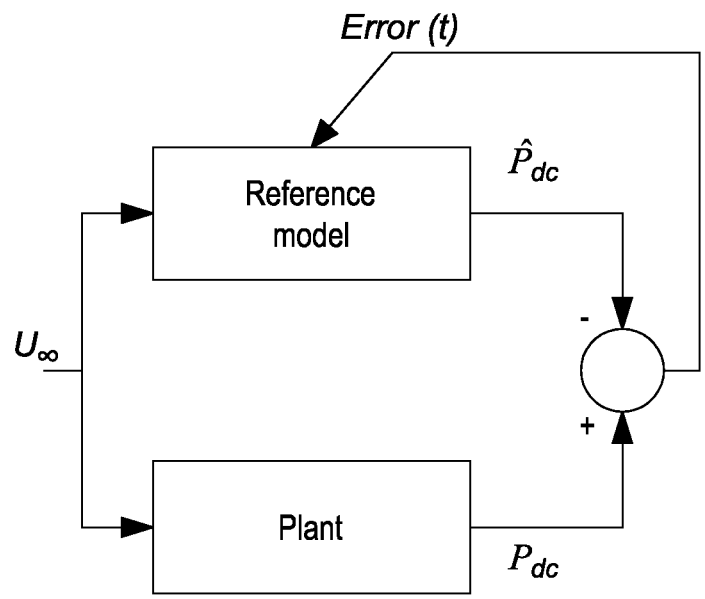
FIG. 27 is an alternative model used to estimate input torque from the wind.

A substantially similar equation but with estimated vs measured power instead of rotor speed could alternatively be used, as illustrated in FIG. 27.

Again, similarly to the optimisation of the losses described above, this is an optimisation problem that can be solved either off-line or in-line, and some constraints can be helpful to estimate the parameters, as there may be many solutions.

In the steady-state regime, rotor speed is constant. Thus, by neglecting mechanical and friction losses, it can be determined that $T_{wind} \approx T_{gen}$.

Eventually, this assumption means that input power and $C_p$ could be estimated from power balancing. Thus:

$$\hat{C}_p = \frac{\hat{T}_{gen} \cdot \omega_m}{\frac{1}{2} A_{swept} \rho_{air} \overline{U_\infty^3}}$$

This equation poorly estimates the input torque on an instantaneous basis. However, averaging or filtering $\hat{T}_{gen}$ improves its prediction.

An alternative method that uses Spectral-Identification of the Drive-Train is described below with reference to FIG. 27, which is a simplified block diagram of a wind energy conversion device, e.g. a turbine, which is described by way of example. The model comprises a control unit that takes into account the drive train, the generator and power convertor, the torque input from wind speed ($T_{wind}$), and mechanical losses $K_m$.

As the drive-train in FIG. 27 is assumed to be linear, both inertia (J) and damping coefficients (B) can be deduced in an open-loop fashion by estimating the frequency response of the drive train. Closed-loop estimation of the entire system shown in FIG. 27 tends to be more difficult due to its non-linearity, although a linearisation can be performed.

In open-loop, the drive-train is assumed to be a low-pass filter with a cut-out frequency $f_{out}$ given by:

$$f_{cut} = \frac{B}{J} \cdot \frac{1}{2\pi}$$

Where B is the damping coefficient of the rotor shaft, and J is the total inertia of all rotating parts.

As the inertia J is big and B small, $f_{cut}$ tends to be very low. Thus, low-frequency sampling still maintains vital information about the system dynamics. The MATLAB function spafdr can perform spectral analysis on frequency-dependent resolutions, over a variable number of frequency bands. This method smooths out the frequency response, by treating the input as a signal influenced by noise and uncertainty. The band selected went from 0.1 to fs/2 with a resolution of 65 bands logarithmically spaced (found by trial-error on a turbine simulator). Focussing on a limited frequency band can give reliable estimations and this was the approach followed.

Afterwards, a straightforward and intuitive continuous-time frequency-response estimation is used, instead of a discrete-approach. The MATLAB function tfest was employed to estimate the continuous transfer function of the drive-train.

In addition, spectral estimation is facilitated thanks to the large amount of data collected in the experiment (e.g. more than an hour) and the gusty wind. Ultimately, wind speed excites this unknown plant. Thus, the significant energy content of the wind in the high-end of the spectrum facilitates signal exploration.

Figure 28:
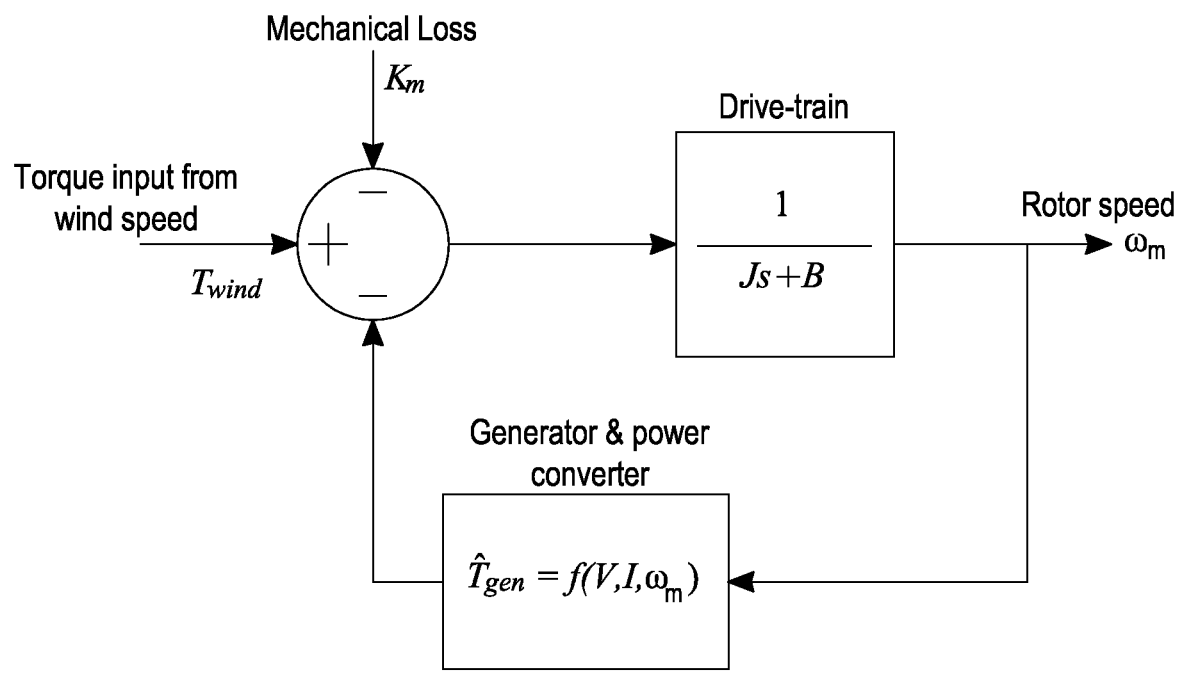
FIG. 28 is a model illustrating mechanical losses in a wind turbine.
Figure 29:
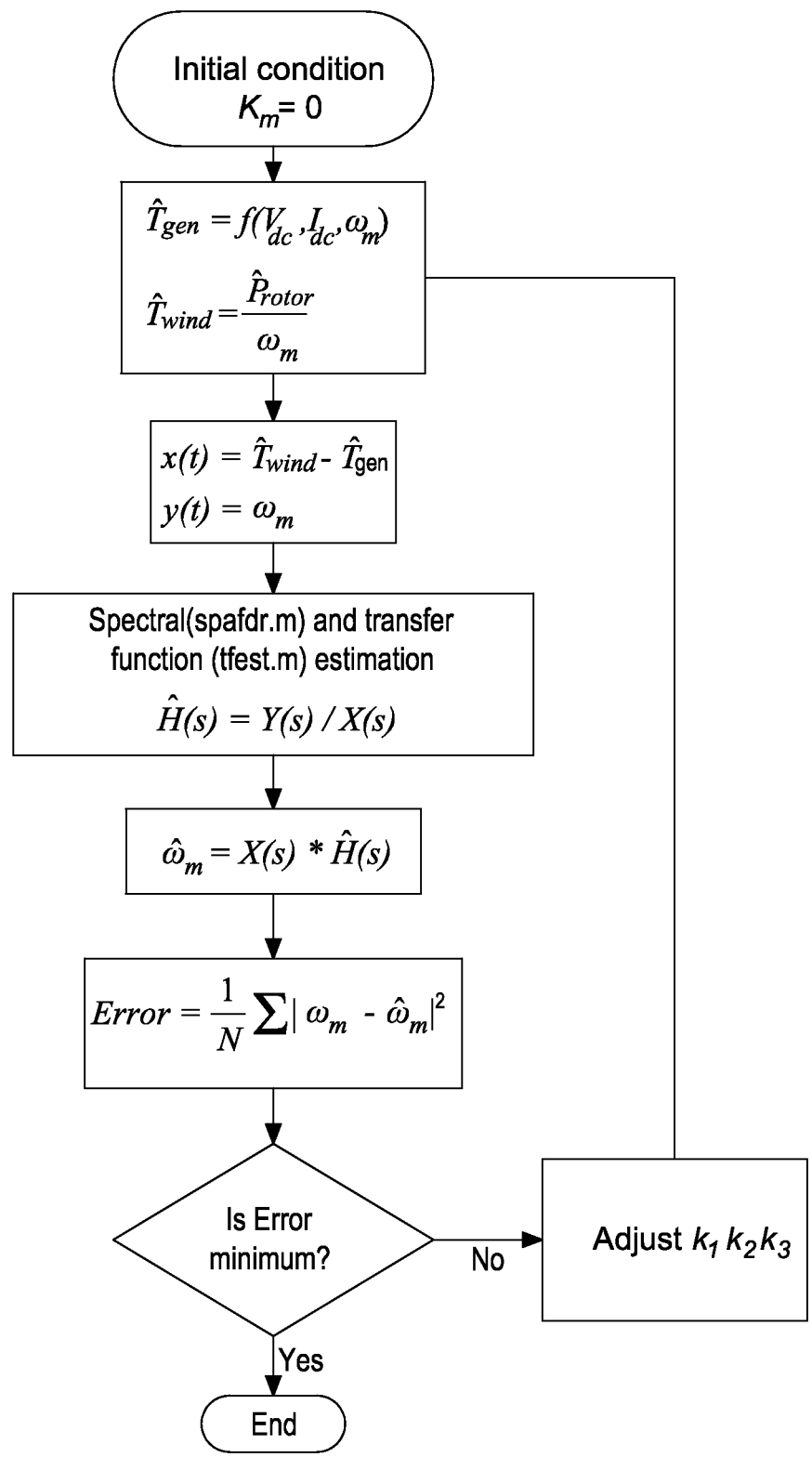
FIG. 29 is flow chart of a method for estimating aerodynamic or hydrodynamic parameters of a wind or tidal turbine.

The general algorithm, excluding mechanical loss estimation, is presented as a flow diagram in FIG. 28. The parameters $k_1$, $k_2$, and $k_3$ of the exponential function from:

$$Cp(\lambda) = (k_1 \lambda - k_2) \cdot e^{-k_3 \lambda}$$

are adjusted by minimising the error of the norm of the error between measured and estimated rotor speed given above, using fmincon from the Optimisation Toolbox in MATLAB. However, mechanical losses are not estimated, because spectral estimation eliminates dc components in input signals.

Even though the modelled wind energy conversion device is based on a direct-drive system, the estimation of the mechanical loss constant $K_m$ affects the calculation of the optimal power curve. Ideally, this constant should be determined in a test-rig using a torque transducer and performing the no-load test, which is well known in the art. In the field, the unsteady wind makes this calculation a bit more complex. Nevertheless, $K_m$ can be estimated from the reference model, under certain assumptions. A margin of error of ±10% is allowed as its accuracy is not as critical as the aerodynamic parameters.

The proposed approach is to estimate $K_m$ in recursive fashion, by starting the spectral estimation with Km=0. Then, from the first estimate of Cp-λ, $K_m$ is calculated by solving the power balance equation (assuming mechanical loss is proportional to rotor speed):

$$\omega_m K_m = P_{rotor} - P_{dc} - P_{gen.loss} - P_{conv.loss} - J\omega_m \frac{d\omega_m}{dt}$$

Then, averaging both sides of this equation allows minimisation of the error produced by the inertial term $$K_m \overline{\omega_m} \approx \overline{\frac{1}{2}\rho A_{swept} C_p(\lambda) U_\infty^3} - \overline{P_{dc}} - \overline{P_{gen.loss}} - \overline{P_{conv.loss}}$$

which is unknown.

$$J\omega_m \frac{d\omega_m}{dt} \approx 0,$$

and finally:

$$\hat{K}_m = \left(\overline{\frac{1}{2}\rho A_{swept} C_p(\lambda) U_\infty^3} - \overline{P_{dc}} - \overline{P_{gen.loss}} - \overline{P_{conv.loss}}\right) \cdot \overline{\omega_m}^{-1}$$

The solution of the latter equation can be integrated as an outer loop in the flow diagram of FIG. 28. Based on transient simulations, the estimation of the mechanical loss exhibits a typical error within ±6:39%.

On a commercial inverter, the access to the internal control algorithms embodied in the device is restricted. Hence, the identification process is more limited than in normal conditions. However, it can be aided in three ways:

1. The power slope setting, or speed response on the inverter: a low value allows the system to operate on points, enabling a more robust estimation. Once the identification process is completed, the power slope needs to be adjusted to properly track the wind fluctuations.
2. Inertia of the turbine and rotor: fortunately this condition turns to be an advantage that allows better inspection of operational points (similarly to power slope), as the actual rotor speed is always lagging the ideal one.

3. Setting power curves of accelerated and decelerated operation, in relation to the optimal tip speed ratio (λ): this greatly improves the robustness of the estimation as more points can be explored. Both simulations and experiments confirm this approach.

The $C_p$-λ curve can be well-detected when the operation points are widely scattered around different values of λ. Thus, if the controller of the inverter is configured to react too fast, then values of λ tend to be concentrated in a limited zone. Consequently, the identification of $C_p$-λ may be inaccurate.

A second exemplary methodology to estimate aerodynamic parameters and mechanical loss, by assuming steady-state conditions is described below.

The method is based on a non-linear fitting function, applied to the averaged data. It is derived from the method of bins.

The general power balance equation of the WECS can be expressed as:

$$P_{dc} = (-1) \cdot \left( J\omega_m \frac{d\omega_m}{dt} + \omega_m K_m + 3\left(I_{dc}\frac{\sqrt{6}}{3}\right)^2 R_{ph} + 2V_{diode}I_{dc} \right) + 0.5\rho_{air}A_{swept}U_\infty^3 C_p(\lambda, k)$$

where $k=(k_1;k_2;k_3)$. By averaging both sides of the equation, neglecting the inertial term, and assuming that $\rho_{air}$ changes very slowly, it gives:

$$\overline{P_{dc}} = \frac{(-1) \cdot (K_m\overline{\omega_m} + 2R_{ph}\overline{I_{dc}^2} + 2V_{diode}\overline{I_{dc}}) + 0.5 A_{swept}\overline{\rho_{air}}}{U_\infty^3 C_p(\lambda,k)}$$

In addition, if the turbine maintains a good tracking response, then the term $C_p(\lambda;k)$ can be considered constant in each bin, allowing the following simplification:

$$\overline{U_\infty^3 \cdot C_p(\lambda)} \approx \overline{U_\infty^3} \cdot C_p(\lambda)$$

This reduces the preceding equation to:

$$\overline{P_{dc}} = \frac{(-1) \cdot (K_m\overline{\omega_m} + 2R_{ph}\overline{I_{dc}^2} + 2V_{diode}\overline{I_{dc}}) + 0.5 A_{swept}}{\overline{\rho_{air}}C_p(\lambda,k)\overline{U_\infty^3}}$$

In this equation, there are four unknown terms: $k_1$, $k_2$, $k_3$, and $K_m$. They can be estimated by non-linear fitting. Let us define X as:

$$X = (\overline{\omega_m}, \overline{I_{dc}}, \overline{\lambda}, \overline{U_\infty^3}, \overline{\rho_{air}})$$

X is a n-by-5 vector of the input measured variables, and Y is a n-by-1 vector of the measured output of the system, $P_{dc}$. Thus, this representation can be expressed as the following relationship:

$$Y = f(X,\beta) + \varepsilon$$

where f is a non-linear function that evaluates each row of X using the coefficients of β, to compute an estimation of Y, $\beta = (k_1; k_2;k_3; K_m)$ is a 4-by-1 vector of constant parameters to be estimated. e is a n-by-1 vector that represents disturbance. Finally:

$$f = \overline{P_{dc}}(X,\beta)$$

The idea of non-linear fitting is to find values for the coefficients of β that minimise the mean squared differences between the measured output power, and the value predicted by the model.

The MATLAB's function nlinfit can estimate the unknown coefficients iteratively, using an initial condition specified by the user. Here, this function is used in its simplest mode, based on the Levenberg-Marquardt non-linear least square algorithm. $K_m$ could be estimated by nlinfit, but it was found that nlinfit tends to fall in a local optimum when allowing four degrees of freedom. Thus, by leaving $K_m$ as a constant value, and performing sub-optimisations until the rms error between Y and $\hat{Y}$ is minimised, it is possible to effectively minimise the error.

The variables in the Equation:

$$\overline{P_{dc}} = \frac{(-1) \cdot (K_m\overline{\omega_m} + 2R_{ph}\overline{I_{dc}^2} + 2V_{diode}\overline{I_{dc}}) + 0.5 A_{swept}}{\overline{\rho_{air}}C_p(\lambda,k)\overline{U_\infty^3}}$$

are averaged using the method of cubic bins, where wind samples are averaged as cubic terms. This greatly improves $C_p$-λ estimation.

Although various specific examples have been provided above in order to illustrate the present invention, it will be appreciated that variations may be made from the above specific embodiments. For example, the above examples relate to wind turbines. However, it will be appreciated that the above approaches are equally applicable to other energy conversion devices, such as water or tidal turbines.

In addition, although various specific equations have been presented for calculating various parameters, it will be appreciated that other equations may be used or the parameters may be calculated in other manners, e.g. using a test rig, static measurements, simulations, modelling, in use measurements, air tunnel or flow chamber measurements, performing measurements on scale models and/or the like. It will be appreciated that a skilled person, guided by the teaching of the present application, and applying knowledge in the art, such as the teaching provided in documents such as E. J. P. E. Subiabre, M. A. Mueller, T. Bertényi and T. Young, "Realistic loss modelling and minimisation in an air-cored permanent magnet generator for wind energy applications," *Power Electronics, Machines and Drives* (PEMD 2012), 6th *IET International Conference on*, Bristol, 2012, pp. 1-6. doi: 10.1049/cp.2012.0324, could determine other methods for determining losses of the system.

In addition, it will be appreciated that the energy conversion device may have additional or alternative components and that the exemplary components presented above are not limiting.

Furthermore, although the algorithm may be run, "in use" or "in line", i.e. such that the results are calculated on the fly and can be used to periodically update the control or target settings, e.g. power or torque curves with wind or water speed, the present invention can also be applied during the design stage or off-line.

In addition, the above examples relate to a permanent magnet state machine type generator. However, it will be appreciated that a skilled person could perform a corresponding technique suitably adapted to a double-fed induction machine.

The control unit 5' and/or auxiliary control unit 30 may comprise at least one processor, a data storage module such as a memory, and a communications module, which may be wired or wireless, for communicating with sensors, such as wind or water speed sensors, voltage, current or power sensors and/or the like As such, the specific embodiments described above in relation to the drawings are not intended to be limiting, with the invention only being defined by the claims presently on file.

| Glossary | |
|---|---|
| $A_{swept}$ | blade swept area |
| B | damping coefficient of rotor shaft |

-continued

Glossary

| | |
|---|---|
| $C_p^{max}$ | maximum aerodynamic efficiency |
| $C_p(\lambda)$ | Rotor's aerodynamic efficiency curve as a function of the tip-speed-ratio |
| $f_B$ | space harmonic frequency |
| $f_e$ | fundamental electric frequency $\equiv 2\pi\omega_e$ |
| $f_s$ | sampling or switching frequency of IGBTs |
| $H(s)$ | transfer function of drive-train |
| $I_{dc}$ | dc current after rectification |
| $I_p$ | peak value of phase current |
| $I_{ph}^{(1)}$ | rms value of fundamental component of phase current |
| $J$ | total inertia of all rotating parts in a WECS |
| $k_1, k_2, k_3$ | aerodynamic parameters of $C_p - \lambda$ |
| $K_m$ | proportional constant to denote mechanical loss in Nm |
| $\lambda$ | tip-speed-ratio $\equiv \dfrac{\omega_m R_{blade}}{U_\infty}$ |
| $L_m$ | air-gap or synchronous inductance |
| $\lambda^{opt}$ | optimal tip-speed-ratio |
| $\lambda_{PM}$ | total flux-linkage per phase induced by PM |
| $m_{index}$ | modulation index |
| $\eta$ | efficiency |
| $\omega_e$ | electric angular frequency $\omega_m p$ $\omega_m$ angular frequency of rotor speed p pole-pair number |
| $P_{active}$ | active electromagnetic power |
| $P_{in}$ | input power in the power converter |
| $P_{inv.loss}$ | total electrical losses in the inverter |
| $P_{conv.loss}$ | total loss in the power converter |
| $P_{core.loss}$ | core rotor loss (in magnets and iron) |
| $P_{dc}$ | DC output power |
| $P_{eddy}$ | eddy current loss in the windings |
| $P_{elect.loss}$ | addition of all electrical losses |
| $P_{gen.loss}$ | total electrical loss in the generator |
| $P_{meas}$ | measured power (generator or power converter) |
| $P_{out}$ | output power delivered by the power converter to the grid |
| $P_{ref}$ | reference power |
| $P_{rotor}$ | rotor input power (from wind) |
| $P_w$ | available power from wind |
| $R_{blade}$ | blade swept area |
| $R_C$ | shunt resistor (iron-cored machine) that accounts for eddy current losses in the windings |
| $R_{Cu}$ | resistor that accounts for Joule losses in the windings |
| $R_{eddy}$ | shunt resistor (air-cored machine) that accounts for eddy current losses in the windings |
| $\rho_{air}$ | air density |
| $\rho_{Cu}$ | copper resistivity |
| $R_{ph}$ | phase resistance |
| $s$ | Laplace operator |
| $T_f$ | time constant of the turbine in closed-loop |
| $T_{gen}$ | generator electromagnetic torque |
| $T_{wind}$ | rotor input torque from wind |
| $U_{nacelle}$ | flow speed measurement in the nacelle |
| $U_\infty$ | freestream flow speed (wind/water) |
| $V_{dc}$ | DC voltage after rectification |
| $V_{diode}$ | diode voltage drop |
| $V_{LL}$ | phase-to-phase voltage of generator (rms value) |
| $\omega_m$ | angular rotational speed |
| $\omega_e$ | angular electric frequency |

ABBREVIATIONS

ADC Analog-to-Digital Converter
AEO Annual Energy Ouput
CFD Computational Fluid Dynamics
DFIG Doubly Fed Induction Generator
DPF Displacement Power Factor
EMF Electro Motive back Force
FEA Finite Element Analysis
FEM Finite Element Modelling
FFT Fast Fourier Transform
FTI Free-stream Turbulence Intensity
IEC International Electrotechnical Commission
IGBT Insulated Gate Bipolar Transistor
LMA Loss Minimisation Algorithm
LIDAR Light Detection and Ranging
MMF Magneto Motive Forces
MPPT Maximum Power Point Tracking
MS Mean Speed
MSE Mean Square Error
PM Permanent Magnet
PMSG Permanent Magnet Synchronous Generator
PSD Power Spectrum Density
RMS Root Mean Square
SVM Space Vector Modulation
TSR Tip Speed Ratio
VSC Voltage Source Converter
WECS Wind Energy Conversion System

The invention claimed is:

1. A method for determining a target power or target torque used to control an energy conversion device, the energy conversion device comprising a rotor, a generator, turbine blades, a drive shaft or other drive coupling, and a power converter, the method comprising:
   measuring or estimating operational data on a regular or periodic basis, said operational data comprising one or more or each of: a rotor speed, a generator speed, a nacelle wind speed, a freestream wind speed, phase currents of the generator, and voltages of the generator;
   determining the losses associated with individual components of the energy conversion device using the operational data, wherein the losses comprise mechanical and electrical losses;
   wherein the mechanical losses arise from mutual interaction between mechanical components of the energy conversion device and comprise losses resulting from or associated with one or more of: operation of turbine blades and/or operation of a drive shaft or other drive coupling and/or operation of the generator;
   wherein the electrical losses comprise one or more or each of: generator losses, power converter losses, filter losses and/or inverter losses; and
   determining, using a processing or control system, the target power or the target torque, used to control the energy conversion device, based on the operational data, the mechanical losses and the electrical losses,
   wherein the determined target power or target torque are associated with operation of the power conversion device in such a way that the total losses of the energy conversion device are reduced below the total losses of the energy conversion device to be expected if an aerodynamic efficiency of the energy conversion device were maximized, thereby also being associated with operation of the energy conversion device in such a way that a steady-state output power of the energy conversion device is increased above the output power of the energy conversion device to be expected if the aerodynamic efficiency of the energy conversion device were maximized at otherwise identical operating conditions,
   wherein the total losses of the energy conversion device include the mechanical losses and the electrical losses; and
   controlling operation of the or a further energy conversion device according to the determined target power or target torque of the energy conversion device.

2. The method according to claim 1, further comprising:
   determining an aerodynamic or hydrodynamic efficiency of the energy conversion device; and determining the target power target torque using the aerodynamic or hydrodynamic efficiency of the energy conversion device.

3. The method according to claim 2, wherein reducing the total losses comprises or considers the aerodynamic or hydrodynamic power efficiency of the energy conversion device.

4. The method according to claim 1, wherein the electrical losses comprise generator losses and power convertor losses.

5. The method according to claim 1, wherein the energy conversion device is or comprises a permanent magnet machine or a double-fed induction machine.

6. The method according to claim 1 wherein the energy conversion device comprises a wind turbine and/or a water turbine.

7. The method according to claim 1 wherein the losses are steady state losses.

8. The method according to claim 1 wherein the mechanical losses are separate to any application of a controlled resistant torque opposed to the rotational movement of the turbine blades.

9. A non-transitory computer-readable carrier medium storing computer code that upon execution by a control or processing device configures the control or processing device to implement to method of claim 1.

10. A processing or control system for an energy conversion device including a rotor, a generator, turbine blades, a drive shaft or other drive coupling, and a power converter, the processing or control system comprising at least one processor and comprising or being configured to access data storage, the processing or control system being at least configured to:
 measure or estimate operational data on a regular or periodic basis, said operational data comprising one or more or each of: a rotor speed, a generator speed, a nacelle wind speed, a freestream wind speed, phase currents of the generator, and voltages of the generator;
 determine the losses associated with individual components of the energy conversion device using the operational data, wherein the losses comprise mechanical and electrical losses;
 wherein the mechanical losses arises from mutual interaction between mechanical components of the energy conversion device and comprise losses resulting from or associated with one or more of: operation of turbine blades and/or operation of a drive shaft or other drive coupling and/or operation of the generator;
 wherein the electrical losses comprise one or more or each of: generator losses, power converter losses, filter losses and/or inverter losses; and
 determine, using a processing or control system, a target power or target torque, used to control the energy conversion device, based on the operational data, the mechanical losses and the electrical losses,
 wherein the determined target power or target torque are associated with operation of the power conversion device in such a way that the total losses of the energy conversion device are reduced below the total losses of the energy conversion device to be expected if an aerodynamic efficiency of the energy conversion device were maximized, thereby also being associated with operation of the energy conversion device in such a way that a steady-state output power of the energy conversion device is increased above the output power of the energy conversion device to be expected if the aerodynamic efficiency of the energy conversion device were maximized at otherwise identical operating conditions,
 wherein the total losses of the energy conversion device include the mechanical losses and the electrical losses; and
 wherein the processing or control system is further configured to control operation of the or a further energy conversion device according to the determined target power or target torque of the energy conversion device.

11. An energy conversion device, the energy conversion device comprising one or more drive surfaces provided on or comprised in a movable or rotatable arrangement such that, in use, the one or more drive surfaces are movable or rotatable by fluid flow, such as gas or liquid flow, and a control or processing device according to claim 10 configured to determine at least one parameter of the energy conversion device.

12. The processing or control system according to claim 10 wherein the mechanical losses are separate to any application of a controlled resistant torque opposed to the rotational movement of the turbine blades.

* * * * *